US012035216B2

United States Patent
Parry

(10) Patent No.: US 12,035,216 B2
(45) Date of Patent: Jul. 9, 2024

(54) SYSTEM FOR DEVICE-TO-DEVICE MEDIA CAPTURING

(71) Applicant: Spotify AB, Stockholm (SE)

(72) Inventor: Owen Benjamin Parry, Cathedral City, CA (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/746,119

(22) Filed: May 17, 2022

(65) Prior Publication Data

US 2022/0377518 A1 Nov. 24, 2022

Related U.S. Application Data

(60) Provisional application No. 63/190,469, filed on May 19, 2021.

(51) Int. Cl.
*H04W 4/80* (2018.01)
*G06F 3/16* (2006.01)
*H04L 67/141* (2022.01)

(52) U.S. Cl.
CPC .............. *H04W 4/80* (2018.02); *G06F 3/165* (2013.01); *H04L 67/141* (2013.01)

(58) Field of Classification Search
CPC ........ H04W 4/80; G06F 3/165; H04L 67/141; H04N 21/41407; H04N 21/4825; H04N 21/8113; H04N 21/422
See application file for complete search history.

(56) References Cited

U.S. PATENT DOCUMENTS

| 10,701,120 | B2* | 6/2020 | Taylor | H04W 4/08 |
| 2013/0117693 | A1 | 5/2013 | Anderson et al. | |
| 2013/0343567 | A1 | 12/2013 | Triplett et al. | |
| 2015/0278217 | A1 | 10/2015 | Schaffhausen | |
| 2015/0285659 | A1* | 10/2015 | Curtis | G01C 22/006 702/97 |

(Continued)

OTHER PUBLICATIONS

Cipriani, Jason, "Here's how easy it is to use iOS 13's audio share feature with your AirPods", Jan. 20, 2020, located online at: https://www.cnet.com/how-to/heres-how-easy-it-is-to-use-ios-13s-audio-share-feature-with-your-airpods/, 5 pages.

(Continued)

*Primary Examiner* — Sm A Rahman
(74) *Attorney, Agent, or Firm* — Merchant & Gould P.C.

(57) ABSTRACT

A system for device-to-device media capturing is described herein. An example system includes a media delivery system of a media service and at least a first and second device associated with respective first and second user accounts of the media service. The first device is also associated with an active media content item provided by the media delivery system that is automatically captured by the second device. For example, as the second device is moved proximate to the first device, one or more wireless communications are transmitted between the devices that trigger device-to-device media capturing. Resultantly, an identifier for the active media content item is stored to a library of the second user account of the media service. The identifier is stored in response to detecting the proximity of the devices and determining that the second device is moving towards the first device.

17 Claims, 11 Drawing Sheets

(56) References Cited

U.S. PATENT DOCUMENTS

| | | | |
|---|---|---|---|
| 2015/0334504 A1* | 11/2015 | Donaldson | G06F 3/0346 |
| | | | 381/307 |
| 2016/0162252 A1 | 6/2016 | Di Censo et al. | |
| 2017/0034263 A1 | 2/2017 | Archambault et al. | |
| 2017/0041376 A1 | 2/2017 | Lin et al. | |
| 2019/0318069 A1* | 10/2019 | Mitic | H04W 12/04 |
| 2022/0045554 A1* | 2/2022 | Leabman | H02J 50/80 |

OTHER PUBLICATIONS

Kickstarter, "Vinci—First Smart Headphones with Artificial Intelligence", last updated Feb. 1, 2018, located online at: https://www.kickstarter.com/projects/inspero/vinci-first-smart-3d-headphones-that-understand-yo, 36 pages.

Mobile Knowledge, "NFC active pairing for audio devices", Jan. 12, 2018, located online at: https://www.themobileknowledge.com/knowledge-base/nfc-active-pairing-for-audio-devices/, 18 pages.

OPPO Global, "What is OPPO's Music Party?", Apr. 30, 2020, located online at: https://oppo.custhelp.com/app/answers/detail/a_id/12890/~/music-party, 14 pages.

European Extended Search Report in Application 22173742.2, mailed Nov. 28, 2022, 9 pages.

Vyas, Kishan, "Tip: You can tap two phones together to quickly start file transfers in Nearby Share", retrieved on Nov. 17, 2022 at https://www.xda-developers.com, Mar. 3, 2021, XP055982781, 3 pages.

European Communication pursuant to Article 94(3) EPC in Application 22173742.2, mailed Nov. 15, 2023, 4 pages.

\* cited by examiner

SYSTEM FOR DEVICE-TO-DEVICE MEDIA CAPTURING

CROSS-REFERENCE TO RELATED APPLICATION(S)

This application claims priority to U.S. Provisional Application No. 63/190,469, filed on May 19, 2021, with the title "SYSTEM FOR DEVICE-TO-DEVICE MEDIA CAPTURING," the disclosure of which is hereby incorporated by reference in its entirety.

BACKGROUND

Media services that provide media content items for user consumption often enable users to like or favorite those media content items. For example, a user is enabled to select an icon or other similar control element of a user interface displayed on a device playing back the media content item. Such selection by a user can cause those media content items to be stored in a library or similar data store that is specific to the user. Storage in the library provides the user with quick access to the media content items for later playback.

In some instances, a first user may be interested in a media content item that is playing back or otherwise active on a media playback device of a second user. However, currently there are no convenient techniques that enable the media content item of interest to be automatically added to the first user's library.

SUMMARY

In general terms, this disclosure is directed to a system for device-to-device media capturing. In one possible configuration and by non-limiting example, a first device is associated with an active media content item that is provided by a media service. A second device that is associated with a user account of the media service is moved proximate to the first device causing transmission of one or more wireless communications between the devices. Device-to-device media capturing is triggered, and an identifier for the active media content item is stored to a library of the user account. For example, the identifier is stored in response to detecting the proximity of the devices and determining that the second device is moving towards the first device. Various aspects are described in this disclosure, which include, but are not limited to, the following aspects.

One aspect is a method for capturing a media content item. An example method includes detecting that a first device and a second device are proximate to one another. The first device is associated with a first user account of a media service and an active media content item provided by the media service. The second device is associated with a second user account of the media service. The example method further includes determining that the second device is moving toward the first device, and storing an identifier of the active media content item to a library associated with the second user account.

Another aspect is a server for device-to-device media capturing. An example server includes at least one processing device and a memory coupled to the at least one processing device and storing instructions. The instructions, when executed by the at least one processing device, cause the at least one processing device to detect that a first device and a second device are proximate to one another. The first device is associated with a first user account of a media service and an active media content item provided by the media service. The second device is associated with a second user account of the media service. The at least one processing device is further caused to determine that the second device is moving toward the first device, and store an identifier of the active media content item to a library associated with the second user account.

A further aspect is a computer readable storage medium. An example computer readable storage medium stores executable instructions that, when executed by at least one processing device, cause the at least one processing device to detect that a first device and a second device are proximate to one another. The first device is associated with a first user account of a media service and an active media content item provided by the media service. The second device is associated with a second user account of the media service. The at least one processing device is also caused to determine that the second device is moving toward the first device, and store an identifier of the active media content item to a library associated with the second user account.

A yet further aspect is a method for device-to-device media capturing. An example method includes detecting that a first device and a second device are proximate to one another. The first device is associated with a first user account of a media service and an active media content item provided by the media service. The second device is associated with a second user account of the media service. The example method further includes determining that the second device is moving toward the first device, and sending an indication to the first device to prompt the first device to transmit an identifier of the active media content item to the second device. The second device stores the identifier to a library associated with the second user account upon receipt from the first device.

Another aspect is a method for capturing a media content item. An example method includes detecting, by a first device that is associated with a first user account of a media service and an active media content item provided by the media service, that a second device is proximate to the first device. The second device is associated with a second user account of the media service. The example method also includes determining that the second device is moving toward the first device, and transmitting an identifier of the active media content item to the second device. The second device stores the identifier to a library associated with the second user account upon receipt from the first device.

DETAILED DESCRIPTION

Figure 1:
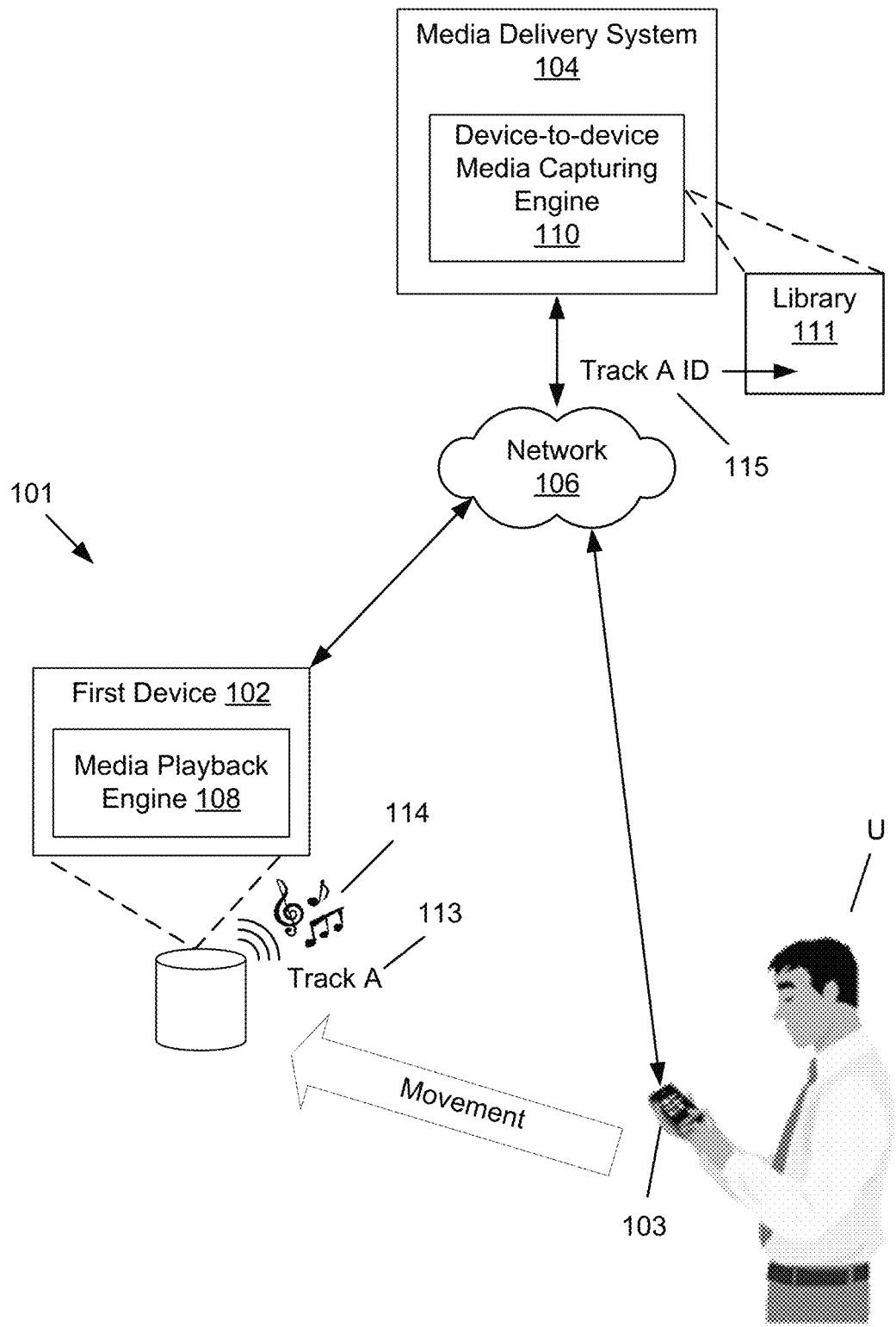
FIG. 1 illustrates an example operating environment for a device-to-device media capturing system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates an example operating environment for a device-to-device media capturing system 100. In this example, the system 100 includes a plurality of media playback devices 101 and a media delivery system 104 that communicate over a network 106. In some embodiments, the media delivery system 104 provides a media service to the media playback devices 101, where each of the media playback devices 101 is associated with a user account of the media service. For example, the media playback devices 101 include a first device 102 associated with a first user account of the media service and a second device 103 associated with a second user account of the media service.

In some embodiments, a media playback engine 108 runs on the media playback devices 101, including first device 102 as illustrated, and a device-to-device media capturing engine 110 runs on the media delivery system 104. Although not illustrated, the media playback engine 108 can also run on the second device 103. In other embodiments, in addition to running on the media delivery system 104, the device-to-device media capturing engine 110 can also run on the media playback devices 101, including the first device 102 and/or the second device 103.

As illustrated in FIG. 1, the first device 102 operates to play back one or more media content items, such as Track A 113. A media content item is an item of media content, including audio, video, or other types of media content, which are stored in any format suitable for storing media content. Non-limiting examples of media content items include songs, albums, music videos, movies, television episodes, podcasts, other types of audio or video content, and portions or combinations thereof. In this document, the media content items can also be referred to as tracks. In some examples, the media content items may be in a form of a playlist.

The first device 102 operates to play the media content items, such as Track A 113, to produce media output 114, the playing thereof facilitated by the media playback engine 108. In some embodiments, the media content items are provided by the media delivery system 104 and transmitted to the first device 102 using the network 106.

A media content item being played by the first device 102, such as Track A 113, is an example type of an active media content item associated with the first device 102. However, in other examples, an active media content item can be a media content item that has been selected for playback but is currently paused or is next in queue to be played by the first device 102. In some embodiments, the first device 102, when associated with an active content item, such as Track A 113, can activate a module that awaits a proximity-based interaction with another device, such as second device 103.

Also shown is a user U who, in this particular example, uses the second device 103 to interact with (e.g., by moving the second device 103 proximate to) the first device 102 to capture the active media content item, Track A 113, being played back by the first device 102. For example, proximity-based communication technologies, such as Near Field Communication (NFC), Radio Frequency Identification (RFID) technologies, BLUETOOTH® Low Energy (BLE) or Wi-Fi®, can be utilized to trigger device-to-device media capturing. For example, based on a proximity of the second device 103 to the first device 102, one or more wireless communications are transmitted between the first device 102 and the second device 103. As described in more detail below, the communications cause each of the first device 102 and the second device 103 to provide user account-related information included in the communications along with device motion data to the media delivery system 104. In another embodiment, facial and gesture recognition techniques can be utilized to trigger the device-to-device media capturing. For example, facial recognition is implemented to identify a user of each of the first device 102 and the second device 103 from which the user account-related information can be determined and provided to the media delivery system 104. Additionally, gestures from one or both users can be recognized that indicate which device user has the intent to capture the active media content item.

The media delivery system 104 is connectable to and operates to provide the media content items to the plurality of media playback devices 101, including first device 102 and second device 103. In some embodiments, the media delivery system 104 provides the media content items to one or more of the media playback devices 101 independently or simultaneously. Additionally, the media delivery system 104 operates to facilitate device-to-device media capturing. For example, when the device-to-device media capturing is triggered upon the second device 103 being moved into proximity with the first device 102, the device-to-device media capturing engine 110 receives information from the devices that are used to determine which, if any of the devices, is a device capturing the active media content item (e.g., a device whose user intends to capture the active media content item).

In the illustrated example, the second device 103 is determined to be the device capturing the active media content item based on the movement of the second device 103 towards the first device 102. For example, the device-to-device media capturing engine 110 receives, from each device, user-account related information exchanged in the communications between the devices and motion data of the device to determine that the second device 103 is proximate to the first device 102 and is moving towards the first device 102. While motion of the devices is discussed herein as an example type of information being used by the device-to-device media capturing engine 110 to determine which device is the device capturing the active media content item, types of information used for such determination are not so limited and can be generally understood as any type of information revealing that an interaction of one device with another device associated with an active media content item is an intentional interaction controlled by a user of the device to capture the active media content item. Another example type of information can include gestures of a user controlling a device, where capture and recognition of a particular gesture by the user can be used to determine that the device is the device capturing the active media content item. In some examples, the gesture of the user can be captured by the device itself and/or by the other device (e.g., the device associated with the active media content item) and provided to the device-to-device media capturing engine 110 for recognition and use in the determination of which device is the device capturing the active media content item.

Based on the determination that the second device 103 is the device capturing the active media content item, the device-to-device media capturing engine 110 may, in some embodiments, store an identifier for the active media content item (e.g., Track A ID 115) to a library 111 of the second user account associated with the second device 103. In other embodiments, the device-to-device media capturing engine 110 transmits an indication to the first device 102 that prompts the first device 102 to transmit the identifier for the active media content item in a wireless communication to the second device 103 such that the second device 103 stores the identifier.

In some examples, upon storage of the identifier, the device-to-device media capturing engine 110 causes immediate playback of the media content item on the second device 103 (e.g., facilitated by a media playback engine of the second device 103). In further examples, the device-to-device media capturing engine 110 provides a notification for display on the second device 103 that indicates the storage of the identifier 115 to the library 111. In one example, the notification is only provided if the media content item is not immediately played back.

Figure 2:
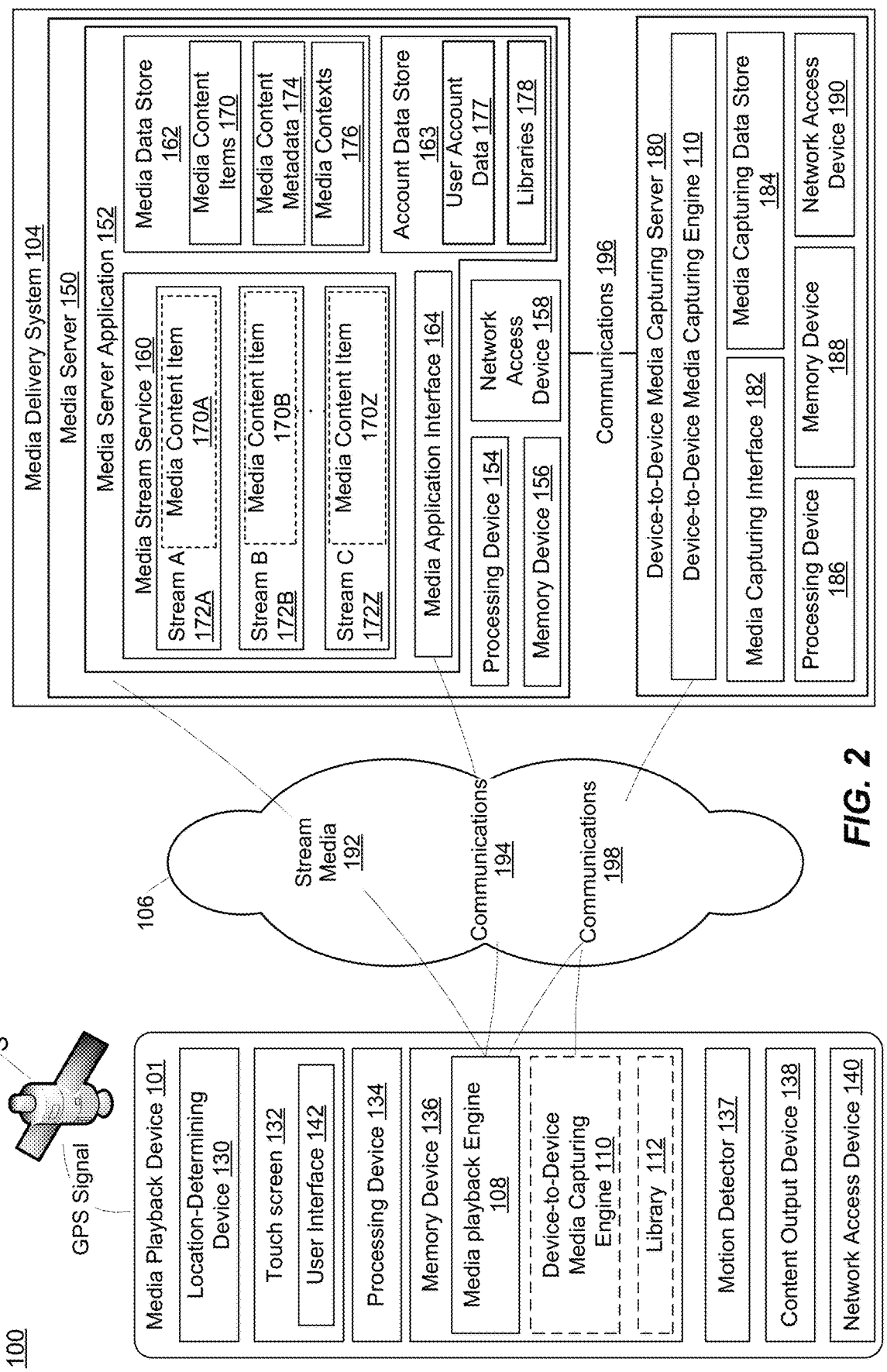
FIG. 2 illustrates an example device-to-device media capturing system.

FIG. 2 illustrates an example device-to-device media capturing system 100. As described herein, a media playback device 101 operates to play media content items. First device 102 and second device 103 described in detail with reference to FIG. 1 are examples of media playback device 101. In some embodiments, the media playback device 101 operates to play media content items that are provided (e.g., streamed, transmitted, etc.) by a system external to the media playback device such as the media delivery system 104, another system, or a peer device. Alternatively, in some embodiments, the media playback device 101 operates to play media content items stored locally on the media playback device 101. Further, in at least some embodiments, the media playback device 101 operates to play media content items that are stored locally as well as media content items provided by other systems.

In some embodiments, the media playback device 101 is a computing device, handheld entertainment device, smartphone, tablet, watch, headphone, wearable device, or any other type of device capable of playing media content. In yet other embodiments, the media playback device 101 is a laptop computer, desktop computer, television, gaming console, set-top box, network appliance, Blu-ray or DVD player, media player, stereo, or radio.

In at least some embodiments, the media playback device 101 includes a location-determining device 130, a touch screen 132, a processing device 134, a memory device 136, a motion detector 137, a content output device 138, and a network access device 140. Other embodiments may include additional, different, or fewer components. For example, some embodiments may include a recording device such as a microphone or camera that operates to record audio or video content. As another example, some embodiments do not include one or more of the location-determining device 130 and the touch screen 132.

The location-determining device 130 is a device that determines the location of the media playback device 101. In some embodiments, the location-determining device 130 uses one or more of the following technologies: Global Positioning System (GPS) technology which may receive GPS signals from satellites S, cellular triangulation technology, network-based location identification technology, Wi-Fi positioning systems technology, and combinations thereof.

The touch screen 132 operates to receive an input from a selector (e.g., a finger, stylus etc.) controlled by a user. In some embodiments, the touch screen 132 operates as both a display device and a user input device. In some embodiments, the touch screen 132 detects inputs based on one or both of touches and near-touches. In some embodiments, the touch screen 132 displays a user interface 142 for interacting with the media playback device 101. As noted above, some embodiments do not include a touch screen 132. Some embodiments include a display device and one or more separate user interface devices. Further, some embodiments do not include a display device.

In some embodiments, the processing device 134 comprises one or more central processing units (CPU). In other embodiments, the processing device 134 additionally or alternatively includes one or more digital signal processors, field-programmable gate arrays, or other electronic circuits.

The memory device 136 operates to store data and instructions. In some embodiments, the memory device 136 stores instructions for a media playback engine 108. Optionally, the memory device 126 also stores instructions for the device-to-device media capturing engine 110. As part of the data stored, the memory device 136 can optionally store at least a portion of a library 112 of a user account for the media service associated with the media playback device 101 locally.

The memory device 136 typically includes at least some form of computer-readable media. Computer readable media include any available media that can be accessed by the media playback device 101. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, Blu-ray discs, digital versatile discs or other optical storage, magnetic cassettes, magnetic tape, magnetic disk storage or other magnetic storage devices, or any other medium that can be used to store the desired information and that can be accessed by the media playback device 101. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The motion detector 137 operates to detect three-dimensional motion of the media playback device 101. In some examples, the motion detector 137 includes an accelerometer that operates to measure acceleration forces acting on the media playback device 101 to determine a position of the media playback device 101 in space and monitor movement of the media playback device 101.

The content output device 138 operates to output media content. In some embodiments, the content output device 138 generates media output 114 (FIG. 1) for the user U. Examples of the content output device 138 include a speaker, an audio output jack, a BLUETOOTH® transmitter, a display panel, and a video output jack. Other embodiments are possible as well. For example, the content output device 138 may transmit a signal through the audio output jack or BLUETOOTH® transmitter that can be used to reproduce an audio signal by a connected or paired device such as headphones or a speaker.

The network access device 140 operates to communicate with other computing devices over one or more networks, such as the network 106. Examples of the network access device include wired network interfaces and wireless network interfaces. Wireless network interfaces include infrared, BLUETOOTH® wireless technology, 802.11a/b/g/n/ac, and cellular or other radio frequency interfaces in at least some possible embodiments.

The media playback engine 108 running on the media playback device 101 operates to play back one or more of the media content items (e.g., audio). As described herein, the media playback engine 108 is configured to communicate with the media delivery system 104 to receive one or more media content items (e.g., through the stream media 192). In some embodiments, the media playback device 101 also stores instructions for the device-to-device media capturing engine 110 locally in the memory device 136 that can be operated independently from or in conjunction with the device-to-device media capturing engine 110 running on the media delivery system 104.

With further reference to FIG. 2, the media delivery system 104 includes one or more computing devices and operates to provide media content items to the media playback device 101 and, in some embodiments, other media playback devices as well. In some embodiments, the media delivery system 104 operates to transmit the stream media 192 to media playback devices 101 such as the first device 102 or second device 103 described in FIG. 1.

In some embodiments, the media delivery system 104 includes a media server 150 and a device-to-device media capturing server 180. In this example, the media server 150 includes a media server application 152, a processing device 154, a memory device 156, and a network access device 158. The processing device 154, memory device 156, and network access device 158 may be similar to the processing device 134, memory device 136, and network access device 140 respectively, which have each been previously described.

In some embodiments, the media server application 152 operates to stream music or other audio, video, or other forms of media content. The media server application 152 includes a media stream service 160, a media data store 162, an account data store 163, and a media application interface 164.

The media stream service 160 operates to buffer media content such as media content items 170 (including 170A, 170B, and 170Z) for streaming to one or more streams 172A, 172B, and 172Z.

The media application interface 164 can receive requests or other communication from media playback devices or other systems, to retrieve media content items from the media delivery system 104. For example, in FIG. 2, the media application interface 164 receives communications 194 from the media playback device 101.

In some embodiments, the media data store 162 stores media content items 170, media content metadata 174, and media contexts 176. The media data store 162 may comprise one or more databases and file systems. Other embodiments are possible as well. As noted above, the media content items 170 may be audio, video, or any other type of media content, which may be stored in any format for storing media content.

The media content metadata 174 operates to provide various pieces of information associated with the media content items 170. The media content metadata 174 includes an identifier for each of the media content items 170. The identifier can be a media service catalog number, for example, by which the media server application 152 can identify the respective media content item from other of the media content items 170. In some embodiments, the media content metadata 174 also includes one or more of title, artist name, album name, length, genre, mood, era, etc. associated with each of the media content items 170. In addition, the media content metadata 174 includes acoustic metadata which may be derived from analysis of the track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. The media content metadata 174 can also include a machine-readable code for each of the media content items 170, where the code is scannable or capable of being captured by a camera of the media playback device 101. In some examples, the machine-readable code can be linked to or include the identifier for media content item. Examples of the media content metadata 174 are illustrated and described in more detail with reference to FIG. 7.

Each of the media contexts 176 is used to identify one or more of the media content items 170. In some embodiments, the media contexts 176 are configured to group one or more of the media content items 170 and provide a particular context to the group of media content items 170. Some examples of the media contexts 176 include albums, artists, playlists, and individual media content items. By way of example, where a media context 176 is an album, the media context 176 can represent that the media content items 170 identified by the media context 176 are associated with that album.

As described above, the media contexts 176 can include playlists. The playlists are used to identify one or more of the media content items 170. In some embodiments, the playlists identify a group of the media content items 170 in a particular order. In other embodiments, the playlists merely identify a group of the media content items 170 without specifying a particular order. Some, but not necessarily all, of the media content items 170 included in a particular one of the playlists are associated with a common characteristic such as a common genre, mood, or era. Examples of the media contexts 176 are illustrated and described in more detail with reference to FIG. 7.

In some embodiments, the account data store 163 includes user account data 177 and libraries 178. The account data store 163 can comprise one or more databases and file systems. The user account data 177 includes data specific to each of a plurality of user accounts associated with the media service. For example, for each user account, the user account data 177 includes one or more media service identifiers for that account. Example media service identifiers can include a user account identifier, a user identifier, and a device identifier for the user account, among other examples. A user account identifier can be a string of numbers and/or letters that identify the user account. A user identifier can be a string of numbers and/or letters that identify a particular user associated with the user account. For example, a single user account can be associated with two or more users, where each user has their own associated user identifier. A device identifier can be a string of numbers and/or letters that identify a device that is associated with the user account. A plurality of devices can be associated with each user account. The user account data 177 can also include information such as an account password and a subscription type. In some examples, the user account data 177 can also include playback state information associated with the user account, such as an active media content item on one or more of the devices associated with the user account. Examples of the user account data 177 are illustrated and described in more detail with reference to FIG. 7.

The libraries 178 include at least one library for each user account (e.g., including the library 112 for the user account associated with the media playback device 101). A library for a user account stores identifiers for a set of media content items that either an associated user manually liked or favorited through a user interface on their device or were automatically captured using device-to device media capturing as described herein (e.g., by the user moving their device in close proximity to another device on which the media content item is an active media content item). In some embodiments, a library is in the form of a playlist. An example library for a user account is illustrated and described in more detail with reference to FIG. 7.

Referring still to FIG. 2, in this example, the device-to-device media capturing server 180 includes the device-to-device media capturing engine 110, a media capturing interface 182, a media capturing data store 184, a processing device 186, a memory device 188, and a network access device 190. The processing device 186, memory device 188, and network access device 190 may be similar to the processing device 134, memory device 136, and network access device 140 respectively, which have each been previously described.

The device-to-device media capturing engine 110 operates to determine which device of two media playback devices detected as being proximate to one another is the device capturing an active media content item associated with the other device. In some examples, the determination can be made based on movement of the devices relative to one another based on information received from each of the media playback devices. The device-to-device media capturing engine 110 then stores an identifier of the active media content item to a library of a user account associated with the device determined to be capturing the active media content item from the other device.

The media capturing interface 182 can receive requests or other communications from other systems. For example, the media capturing interface 182 receives communications 196 from the media server application 152, the communications including an identifier of an active media content item on one or more of the media playback devices 101 involved in the device-to-device media capturing. The media capturing interface 182 can also send requests to the media server application 152 (e.g., through the communications 196). For example, the requests include to store the identifier of the active content item associated with a particular media playback device to a library (e.g., within libraries 178) of a user account associated with another media playback device that is determined by the device-to-device media capturing engine 110 to be the device capturing the active media content item (e.g., the device that is proximate and moving toward that particular media playback device).

Additionally, the media capturing interface 182 may facilitate transmission of the communications 198 to media playback devices (e.g., to media playback engine 108 and/or device-to-device media capturing engine 110 of media playback device 101). In some embodiments, the communications 196 can indicate whether that media playback device 101 is a transmitting device or a receiving device in the device-to-device capturing process based on if the media playback device 101 is determined to be capturing the active media content item. For example, if the media playback device 101 is determined not to be capturing the active media content item then it is a transmitting device, and in some examples, is prompted to transmit the identifier of the active media content item to the other device (e.g., the receiving device) over a wireless communication. In other examples, the communications 198 include a notification for display on the media playback device 101 that can indicate either the identifier of the active media content item has been stored in the library or that the active media content item has been captured by another device dependent on whether the media playback device 101 is the device capturing the active media content item or not.

In some embodiments, the media capturing data store 184, at least temporarily, stores information received from the media playback devices that is used by the device-to-device media capturing engine 110 to determine which device is capturing the active media content (e.g., user-account related information and device motion data to detect proximity and determine relative movement of the devices to one another). The media capturing data store 184 can also, at least temporarily store the identifier for the active content items received from the media server application 152 via the communications 196. The media capturing data store 184 may comprise one or more databases and file systems. Other embodiments are possible as well.

Referring still to FIG. 2, the network 106 is an electronic communication network that facilitates communication between the media playback device 101 and the media delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including BLUETOOTH®, ultra-wideband (UWB), 802.11, ZigBee, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

Although FIG. 2 illustrates only a single media playback device 101 communicable with a single media delivery system 104, in accordance with some embodiments, the media delivery system 104 can support the simultaneous use of multiple media playback devices, and the media playback device can simultaneously access media content from multiple media delivery systems. Additionally, although FIG. 2 illustrates a streaming media based system for facilitating automatic capture of media content items from one device to another, other embodiments are possible as well. For example, in some embodiments, the media playback device 101 includes a media data store 162 and an account data store 163 stored locally and is configured to perform device-to-device media capturing without accessing the media delivery system 104, as described in detail in FIG. 6 below.

Figure 3:
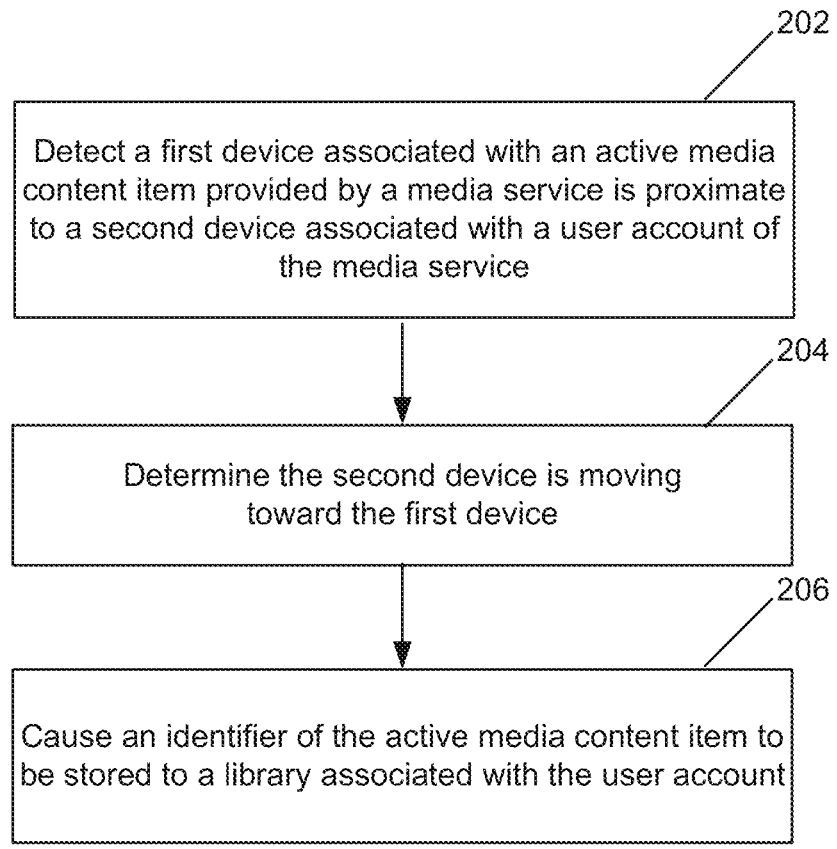
FIG. 3 illustrates an example method for device-to-device media capturing.

FIG. 3 illustrates an example method 200 for device-to-device media capturing. In this example, the method 200 is described as being performed by the device-to-device media capturing engine 110. In some examples, the device-to-device media capturing engine 110 is running on the media delivery system 104 (e.g., on the device-to-device media capturing server 180 of the media delivery system 104). In other examples, the device-to-device media capturing engine 110 is running on a media playback device 101, such as on one or both of the first device 102 and the second device 103 described in FIG. 1.

The method can begin at operation 202, where a first device associated with an active media content item provided by a media service is detected to be proximate to a second device. The second device is associated with a user account of the media service (e.g., a second user account). The first device can also be associated with a different user account of the media service (e.g., a first user account). In some examples, the active media content item is a media content item that is being played by the first device or is selected for playback but is currently paused. In other examples, the active media content item can be an item in queue for playback by the first device.

In some embodiments, due to the active media content item, a module of the first device is activated that awaits a proximity-based interaction with another device. For example, the proximity of the first and second devices to one another causes one or more wireless communications to be transmitted between the first and second devices. Example types of wireless communications can include NFC, RFID, BLE, or Wi-Fi communications. Within these communications, user account-related information, such as one or more media service identifiers for the first and second user account, can be exchanged between the first and second devices. For example, the first device receives a second media service identifier associated with the second user account from the second device, and the second device receives a first media service identifier associated with the first user account from the first device in the one or more wireless communications. These communications can serve to trigger the device-to-device media capturing. In some embodiments, this trigger causes information, including the respective media service identifiers exchanged, to be provided from the first and second devices to the device-to-device media capturing engine 110. The first device and the second device can be detected to be proximate to one another based on a correlation between the respective media service identifier received from the respective device. In some examples, additional or alternative data such as GPS data or other similar data collected by the devices (e.g., by the location-determining device 130 of media playback device 101 described in FIG. 2) and provided to the device-to-device media capturing engine 110 can be used to detect proximity of the first and second devices.

Once proximity of the first and second devices are detected, the second device is determined to be moving toward the first device at operation 204. The determination can be made based on a comparison of motion data collected by the motion detector 137 of each device. In some embodiments, the motion data includes an acceleration of each device at a point in time that the devices came into very close or actual physical contact (e.g., came into proximity of one another) causing the one or more wireless communications to be transmitted between the first and second devices. Example processes for determining the movement of the first and second devices relative to one another is described in more detail with respect to FIG. 8.

At operation 206, an identifier of the active media content item is caused to be stored to a library associated with the user account associated with the second device (e.g., the second user account). That is, the identifier rather than the active media content item itself is stored to the library. Storage of the identifier to the library allows the respective user of the user account to quickly locate and access the active media content item for later playback. In some embodiments, and as described in more detail with respect to FIG. 11, once the identifier is stored, the active media content item can be immediately played back on the second device and/or a notification can be provided for display on one or both of the first device and the second device to provide feedback that the capture occurred.

In this example method 200, the identifier of the active media content item is caused to be stored to a library associated with the user account of the second device that is determined to be moving toward the first device. This is based on an assumption that movement of the second device toward the first device indicates that a user of the second device controlling the movement has the intent to capture the active media content item. However, the systems and methods described herein are not so limited.

In other scenarios, the second device moving towards the first device as controlled by a user of the second device can indicate the user is willing to share the active media content item with the first device (e.g., in response to a user of the first device indicating they were interested in the active media content item). In such scenarios, determination that the second device is moving toward the first device can cause the identifier of the active media content item to be stored to a library of the user account associated with the first device.

In further scenarios, the first and second users of the first device and second device are both moving their devices toward one another. In one embodiment, if only the first device has an associated active media content item, and both the first and second devices are determined to be moving toward one another, the identifier of the active media content item is caused to be stored to a library associated with the user account associated with the second device.

In other embodiments, if both the first and second devices have an associated active media content item, and both the first and second devices are determined to be moving toward one another, the outcome can be dependent on an acceleration of each device. This is based on an assumption that a greater acceleration (e.g., a quicker movement) of a device indicates that a user of that device controlling the movement has the intent to capture the active media content item. For example, if the second device is moving towards the first device at a greater acceleration than the first device is moving toward the second device, the identifier of the active media content item is caused to be stored to a library associated with the user account associated with the second device.

In some embodiments, the difference in a first acceleration of the first device and a second acceleration of the second device must be above a predefined threshold value to cause an active media content item to be stored to a library of a user account associated with the device having the greater acceleration when active media content items are associated with each device. In one embodiment, if the threshold is not met, neither identifier is stored to a library of a user account associated with the other device. This outcome is based on an assumption that neither user of the first or second device had the intention to capture the active media content item associated with the other device. In another embodiment, if the threshold is not met, the identifier for each active media content item on the first and second device is caused to be stored to a library of a user account associated with the other device. For example, the identifier for the active media content item associated with the first device is stored to a library of a user account associated with the second device, and the identifier for the active media content item associated with the second device is stored to a library of a user account associated with the first device. This outcome is based on the assumption that both users of the first and second device had equal intentions to capture the active media content item associated with the other device based on the similar accelerations of the first and second devices toward one another.

Figure 4:
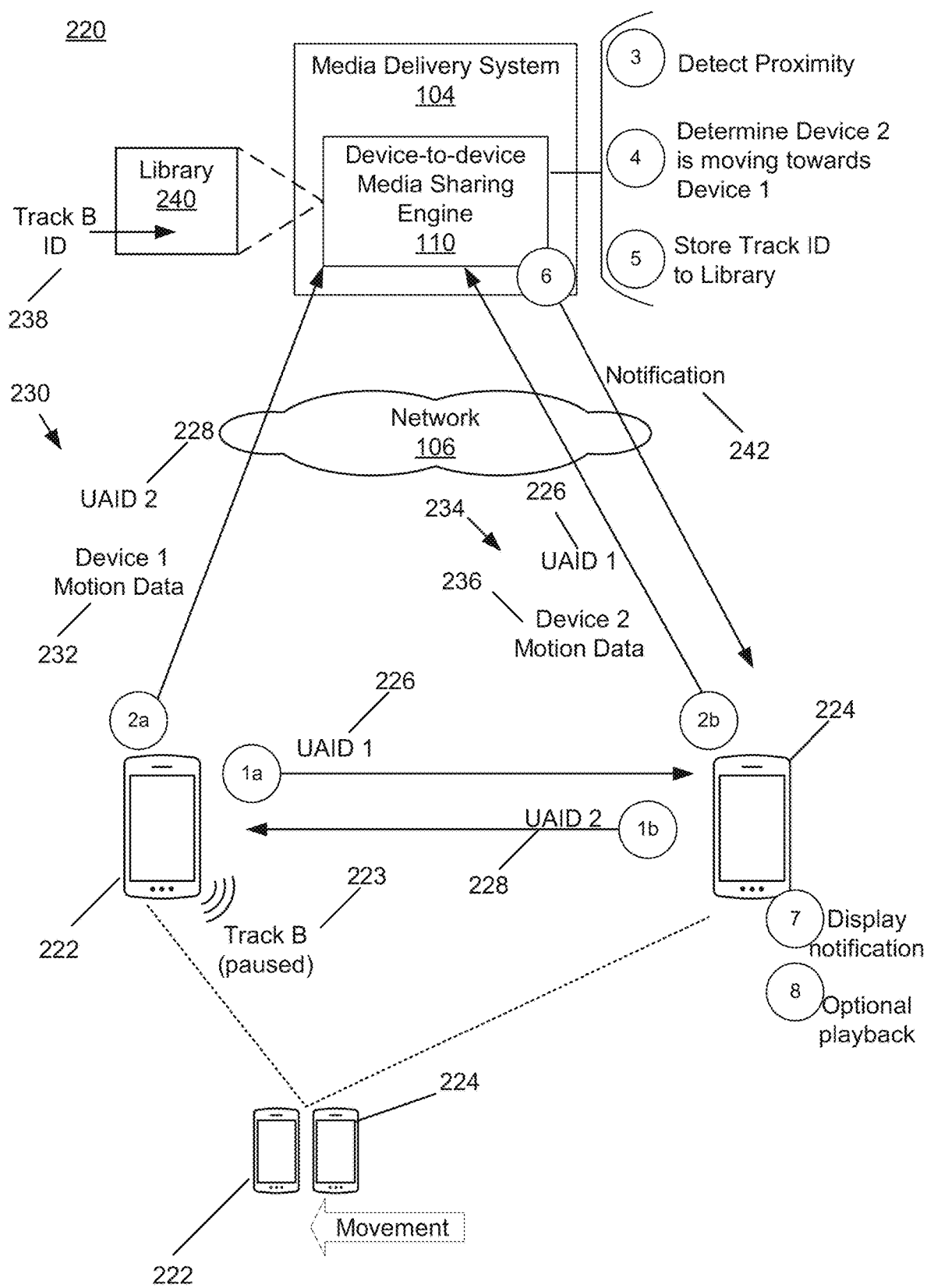
FIG. 4 illustrates a conceptual diagram for a first configuration of a device-to-device media capturing system.

FIG. 4 illustrates a conceptual diagram 220 for a first configuration of a device-to-device media capturing system. As shown in diagram 220, at least two media playback devices 101, such as a first device 222 and a second device 224, come into proximity of one another as the second device 224 is moved toward the first device 222 into very close or actual physical contact. The first device 222 is associated with an active media content item. For example, the first device 222 is playing Track B 223, however the playback may be currently paused. In some examples, the first device 222 or another peripheral device paired to the first device 222 visually displays information about the active media content item associated with the first device 222. For example, at least a portion of the media content metadata 174 for Track B 223 stored in the media data store 162 is received and displayed on a user interface of the first device 222. The portion of the media content metadata 174 can include a machine-readable code, cover art, and/or a text description, including information such as title, artist name, album name, length, genre, mood, or era. In some embodiments, the first device 222, when associated with the active content item, can activate a module that awaits a proximity-based interaction with another device, such as second device 224.

In this example, both the first device 222 and the second device 224 are smartphones that are NFC capable. As the second device 224 is moved toward the first device 222 and into a predefined NFC range of the first device 222 for a predefined time period (e.g., when the second device 224 taps the first device 222), NFC communication is initiated to exchange data between the first device 222 and the second device 224 over one or more wireless communications (e.g., initiating performance of device-to-device media capturing process steps). As one example, at steps 1a and 1b, at least one media service identifier (MSID) of a user account associated with each of the first device 222 and the second device 224 is exchanged. One example type of MSID includes a user account identifier. The user account identifier can be a string of numbers and/or letters that identify a user account of the media service. For example, at step 1a, a first user account identifier (UAID 1) 226 for a first user account associated with the first device 222 is transmitted from the first device 222 to the second device 224 over a wireless communication. At step 1b, a second user account identifier (UAID 2) 228 for a second user account associated with the second device 224 is transmitted from the second device 224 to the first device 222 over another wireless communication.

Upon exchange of the user account identifiers 226, 228, the first device 222 and the second device 224 transmit sets of information 230, 234 over the network 106 to the media delivery system 104 for use by the device-to-device media capturing engine 110 at steps 2a and 2b. Specifically, at step 2a, a first set of information 230 transmitted by the first device 222 includes the second user account identifier 228 received from the second device 224 in the NFC communication data exchange and first motion data (Device 1 Motion Data) 232 of the first device 222. In some examples, the first set of information 230 can also include location data (e.g., GPS coordinates) of the first device 222.

In further examples, the first set of information 230 can also include an indication or identifier of the active media content item associated with the first device 222 (e.g., an identifier of Track B 223). Additionally or alternatively, the device-to-device media capturing engine 110 receives the indication or identifier of the active media content item associated with the first device 222 from the media server application 152 based on playback state information maintained by the media server application 152 (e.g., stored in account data store 163). For example, the device-to-device media capturing engine 110 can request playback state information of the first device 222 and/or second device 224 from the media server application 152 upon receipt of the first and second sets of information 230, 234.

At step 2b, a second set of information 234 transmitted by the second device 224 includes the first user account identifier 226 received from the first device 222 in the NFC communication data exchange and second motion data (Device 2 Motion Data) 236 of the second device 224. In some examples, the second set of information 234 can also include location data (e.g., GPS coordinates) of the second device 224.

At step 3, upon receipt of the first and second sets of information 230, 234 from the first and second devices 222, 224, the device-to-device media capturing engine 110 detects the proximity of the first device 222 and the second device 224 to one another based on the media service identifiers received in the first and second sets of information 230, 234. For example, based on receiving the second user account identifier 228 associated with the second device 224 from the first device 222 and the first user account identifier 226 associated with the first device 222 from the second device 224, a correlation between the first device and the second device 224 can be made that is indicative of the first device 222 and the second device 224 being proximate to one another. This correlation can be made given a known understanding that media service identifiers, such as user account identifiers, are exchanged between devices when the devices are proximate to one another.

Additionally or alternatively, location data of the first and second devices 222, 224 included in the received first and second sets of information 230, 234 can be utilized by the device-to-device media capturing engine 110 to detect and/or confirm the proximity of the first device 222 and the second device 224.

Once the first device 222 and the second device 224 are determined to be proximate to one another, at step 4, the device-to-device media capturing engine 110 determines the second device 224 is moving toward the first device 222 based on the first motion data 232 of the first device 222 and the second motion data 236 of the second device 224 received in the first and second sets of information 230, 234, respectively. For example, a comparison of the first motion data 232 and the second motion data 236 indicates that the first device 222 is relatively stationary or is at least moving towards the second device 224 at a lesser acceleration than an acceleration at which the second device 224 is moving toward the first device 222. In some embodiments, the movement of the second device 224 toward the first device 222 and at a greater acceleration indicates a deliberate movement of the second device 224 by a user controlling that movement, which is indicative of the user's intent to capture the active media content item (e.g., Track B 223) of the first device 222. Resultantly, the device-to-device media capturing engine 110 determines the second device 224 is the receiving device that is capturing the active media content item.

At step 5, the device-to-device media capturing engine 110 can then store an identifier for the active media content item (e.g., Track B ID 238) in a library 240 for the second user account associated with the second device 224 that has been designated as the receiving device that is capturing the active media content item.

At step 6, the device-to-device media capturing engine 110 provides a notification 242 to the second device 224 for display on the second device 224 at step 7. The notification 242 includes an indication that the identifier for the active media content item has been stored in the library 240. The notification 242 serves as positive feedback to a user of the second device 224 to confirm to the user that the media delivery system 104 has fulfilled the user's intent to capture the active media content item. Optionally, at step 8 and as described in more detail with reference to FIG. 11, the second device 224 can begin immediate playback of the active media content item. In such examples, the media server application 152 can provide the active media content item to the second device 224 for playback. In some embodiments, if immediate playback occurs, the notification is not displayed and the playback itself serves as the positive feedback to the user of the second device 224.

In further embodiments, a notification can also be provided to the first device 222 for display, where the notification indicates that the active media content item, Track B 223, has been captured by another device, for example.

Figure 5:
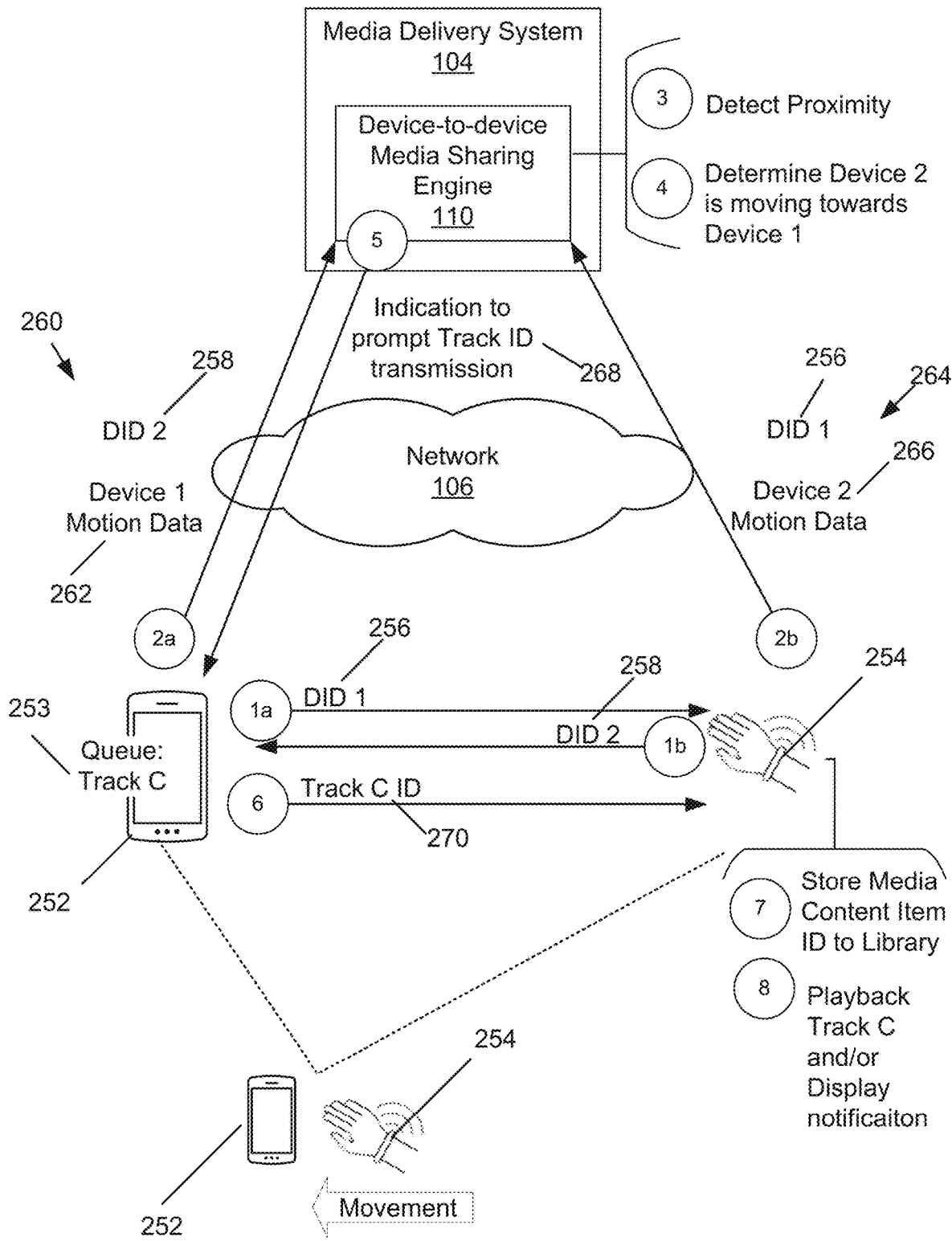
FIG. 5 illustrates a conceptual diagram for a second configuration of a device-to-device media capturing system.

FIG. 5 illustrates a conceptual diagram 250 for a second configuration of a device-to-device media capturing system. As shown in diagram 250, at least two media playback devices 101, such as a first device 252 and a second device 254, come into proximity of one another as the second device 254 is moved toward the first device 252 into very close or actual physical contact. The first device 252 is associated with an active media content item. For example, Track C 253 is next in queue for playing by the first device 252. In some examples, the first device 252 or another peripheral device paired to the first device 252 visually displays information about the active media content item associated with the first device 252. For example, at least a portion of the media content metadata 174 for Track C 253 stored in the media data store 162 is received and displayed, including a machine-readable code, cover art, and/or a text description, including information such as title, artist name, album name, length, genre, mood, or era. In some embodiments, when associated with the active content item, a module of the first device 252 is activated that awaits a proximity-based interaction with another device, such as second device 254.

In this example, the first device 252 is a smartphone and the second device 254 is a wearable smart band, where both are NFC capable. As the second device 254 is moved toward the first device 252 and into a predefined NFC range of the first device 252 for a predefined time period (e.g., when the second device 254 taps the first device 252), NFC communication is initiated to exchange data between the first device 252 and the second device 254 over one or more wireless communications (e.g., initiating performance of device-to-device media capturing process steps). As one example, at steps 1a and 1b, at least one media service identifier (MSID) of a user account associated with each of the first device 252 and the second device 254 is exchanged. One example type of MSID includes a device identifier. The device identifier can be a string of numbers and/or letters that identify a device having a known association with a user account of the media service. For example, at step 1a, a first device identifier (DID 1) 256 for the first device 252 associated with a first user account is transmitted from the first device 252 to the second device 254 over a wireless communication. At step 1b, a second device identifier (DID 2) 258 for the second device 254 associated with a second user account is transmitted from the second device 254 to the first device 252 over another wireless communication.

Upon exchange of the device identifiers 256, 258, the first device 252 and the second device 254 transmit sets of information 260, 264 over the network 106 to the media delivery system 104 for use by the device-to-device media capturing engine 110 at steps 2a and 2b. Specifically, at step 2a, a first set of information 260 transmitted by the first device 252 includes the second device identifier 258 received from the second device 254 in the NFC communication data exchange and first motion data (Device 1 Motion Data) 262 of the first device 252. In some examples, the first set of information 260 can also include location data (e.g., GPS coordinates) of the first device 252.

In further examples, the first set of information 260 can also include an indication or identifier of the active media content item associated with the first device 252 (e.g., an identifier of Track C 253). Additionally or alternatively, the device-to-device media capturing engine 110 receives the indication or identifier of the active media content item associated with the first device 252 from the media server application 152 based on playback state information maintained by the media server application 152 (e.g., stored in account data store 163). For example, the device-to-device media capturing engine 110 can request playback state information of the first device 252 and/or second device 254 from the media server application 152 upon receipt of the first and second sets of information 260, 264.

At step 2b, a second set of information 264 transmitted by the second device 254 includes the first device identifier 256 received from the first device 252 in the NFC communication data exchange and second motion data (Device 2 Motion Data) 266 of the second device 224. In some examples, the second set of information 264 can also include location data (e.g., GPS coordinates) of the second device 254.

At step 3, upon receipt of the first and second sets of information 260, 264 from the first and second devices 252, 254, the device-to-device media capturing engine 110 detects the proximity of the first device 252 and the second device 254 to one another based on the media service identifiers, such as the device identifiers 256, 258 received in the first and second sets of information 260, 264. For example, based on receiving the second device identifier 258 associated with the second device 254 from the first device 252 and the first device identifier 256 associated with the first device 252 from the second device 254, a correlation between the first device and the second device 254 can be made that is indicative of the first device 252 and the second device 254 being proximate to one another. This correlation can be made given a known understanding that media service identifiers are exchanged between devices when the devices are proximate to one another.

Additionally or alternatively, location data of the first and second devices 252, 254 included in the received first and second sets of information 260, 264 can be utilized by the device-to-device media capturing engine 110 to detect and/or confirm the proximity of the first device 252 and the second device 254.

Once the first device 252 and the second device 254 are determined to be proximate to one another, at step 4, the device-to-device media capturing engine 110 determines the second device 254 is moving toward the first device 252 based on the first motion data 262 of the first device 252 and the second motion data 266 of the second device 254 received in the first and second sets of information 260, 264, respectively. For example, a comparison of the first motion data 262 and the second motion data 266 indicates that the first device 252 is relatively stationary or is at least moving towards the second device 254 at a lesser acceleration than an acceleration at which the second device 254 is moving toward the first device 252. In some embodiments, the movement of the second device 254 toward the first device 252 and at a greater acceleration indicates a deliberate movement of the second device 254 by a user controlling that movement, which is indicative of the user's intent to capture the active media content item (e.g., Track C 253) of the first device 252. Resultantly, the device-to-device media capturing engine 110 determines the first device 252 as a transmitting device and the second device 254 as the receiving device that is capturing the active media content item.

At step 5, the device-to-device media capturing engine 110 transmits an indication 268 over the network 106 to the first device 252 (e.g., the determined transmitting device). In some examples, the indication 268 prompts the first device 252 to transmit an identifier for the active media content item (e.g., Track C ID 270) to the second device 254 (e.g., the determined receiving device) over a wireless communication, such as an NFC communication. At step 6, the first device 252 transmits the Track C ID 270 in a wireless communication to the second device 254 responsive to the indication 268 received from the device-to-device media capturing engine 110.

At step 7, the second device 254 can then store the Track C ID 270 included in the communication transmitted by the first device 252 in a library for the second user account associated with the second device 254. At step 8, and as discussed in more detail with respect to FIG. 11, the second device 224 can begin immediate playback of the active media content item and/or display a notification indicating that the identifier for the active media content item has been stored in the library. The immediate playback and/or notification serves as positive feedback to a user of the second device 254 to confirm to the user that the media delivery system 104 has fulfilled the user's intent to capture the active media content item. In some embodiments, if immediate playback occurs, the notification is not displayed and the playback itself serves as the positive feedback. In other embodiments, a notification can also be displayed on the first device 252, where the notification indicates that the active media content item has been captured by the second device 254.

Figure 6:
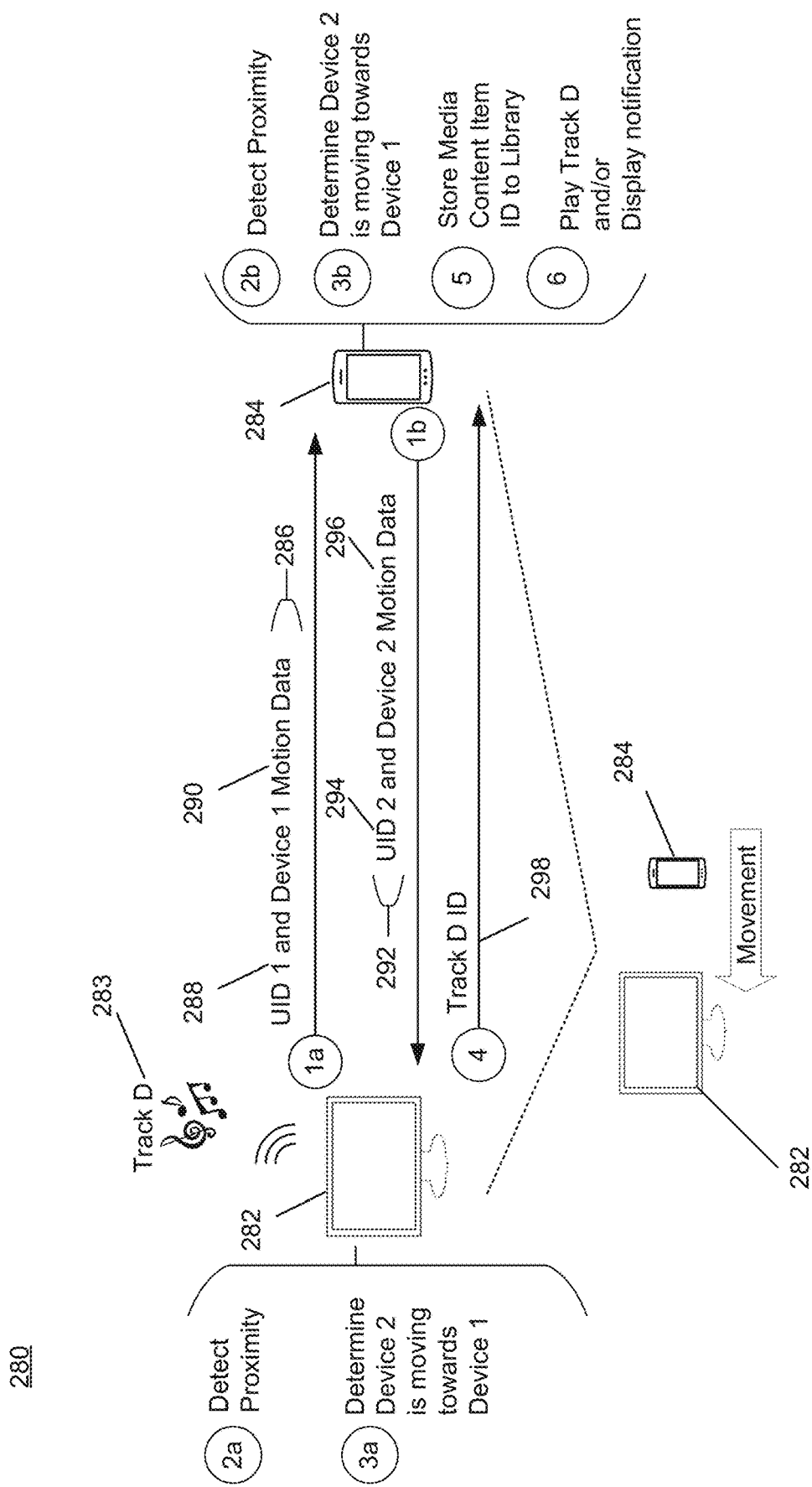
FIG. 6 illustrates a conceptual diagram for a third configuration of a device-to-device media capturing system.

FIG. 6 illustrates a conceptual diagram 280 for a third configuration of a device-to-device media capturing system. In this third configuration, each of the steps of the device-to-device media capturing process are being executed by one or more media playback devices 101 independently from the media delivery system 104 (e.g., utilizing instructions for the device-to-device media capturing engine 110 stored locally on the media playback devices 101 as described in FIG. 2). As one illustrative scenario, this third configuration is implemented when at least one of the media playback device 101 is unable to connect to the media delivery system 104.

As shown in diagram 280, at least two media playback devices 101, such as a first device 282 and a second device 284, come into proximity of one another as the second device 284 is moved toward the first device 282 into very close or actual physical contact. The first device 282 is associated with an active media content item. For example, Track D 283 is currently being played by the first device 282. In some examples, the first device 282 or another peripheral device paired to the first device 282 visually displays information about the active media content item associated with the first device 282. For example, at least a portion of the media content metadata 174 for Track D 283 can be displayed, including a machine-readable code, cover art, and/or a text description, including information such as title, artist name, album name, length, genre, mood, or era. In some embodiments, the first device 282, when associated with the active content item, can activate a module that awaits a proximity-based interaction with another device, such as second device 284.

In this example, the first device 282 is a smart television and the second device 284 is a smartphone, where both are NFC capable. As the second device 284 is moved toward the first device 282 and into a predefined NFC range of the first device 282 for a predefined time period (e.g., as the second device 284 taps the first device 282), NFC communication is initiated to exchange data between the first device 282 and the second device 284 over one or more wireless communications (e.g., initiating performance of device-to-device media capturing process steps).

As one example, at steps 1a and 1b, sets of information 286, 292 are exchanged between the first and second devices 282, 284. Each of the sets of information 286, 292 can include at least one media service identifier (MSID) of a user account associated with each of the first device 282 and the second device 284. One example type of MSID includes a user identifier associated with a user account. A user identifier can be a string of numbers and/or letters that identify a particular user of one or more users associated with the user account of the media service. Each of the sets of information 286, 292 can also include motion data associated with each of the first device 282 and the second device 284. For example, at step 1a, a first user identifier (UID 1) 288 for a first user account associated with the first device 282 and first motion data (Device 1 Motion Data) 290 of the first device 282 is transmitted from the first device 282 to the second device 284 over one or more wireless communications. At step 1b, a second user identifier (UID 2) 294 for a second user account associated with the second device 284 and second motion data (Device 2 Motion Data) 296 of the second device 284 is transmitted from the second device 284 to the first device 282 over one or more other wireless communication.

Upon exchange of the sets of information 286, 292, the device-to-device media capturing engine 110 running locally on each of the first device 282 and the second device 284 detects the proximity of the first device 252 and the second device 254 to one another at steps 2a and 2b. Specifically, at step 2a the device-to-device media capturing engine 110 running locally on the first device 282 detects the proximity of the first device 252 and the second device 254, and at step 2b the device-to-device media capturing engine 110 running locally on the second device 284 detects the proximity of the first device 252 and the second device 254. In some embodiments, the device-to-device media capturing engine 110 is able to identify the other proximate device involved based on the media service identifiers, such as the user identifiers 288, 294 received in the first and second sets of information 286, 292.

At steps 3a and 3b, the device-to-device media capturing engine 110 stored locally on each of the first and second devices 282, 284 independently determines that the second device 284 is moving toward the first device 282 based on a comparison of the first motion data 290 of the first device 282 and the second motion data 296 of the second device 284. Each of the first and second devices 282, 284 has access to its own motion data, and then receives the motion data of the other device as part of the sets of information received.

In this example, a comparison of the first motion data 290 and the second motion data 296 indicates that the first device 282 is stationary and the second device 284 is moving toward the first device 282. In some embodiments, the movement of the second device 284 toward the first device 282 indicates a deliberate movement of the second device 284 by a user controlling that movement, which is indicative of the user's intent to capture the active media content item (e.g., Track D 283) of the first device 282. Resultantly, the device-to-device media capturing engine 110 running locally on each of the first and second devices 282, 284 independently designates the first device 282 as a transmitting device and the second device 284 as the receiving device that is capturing the active media content item.

At step 4, the first device 282 based on its designation as the transmitting device transmits an identifier for the active media content item (e.g., Track D ID 298) to the second device 284 designated as the receiving device over a wireless communication, such as an NFC communication. In some embodiments, the active media content item itself can also be transmitted.

At step 5, the second device 284 can then store the Track D ID 298 included in the communication transmitted by the first device 282 in a library for the second user account associated with the second device 284. At step 6, and as described in more detail with reference to FIG. 11, the second device 284 can begin immediate playback of the active media content item and/or display a notification indicating that the identifier for the active media content item has been stored in the library. The immediate playback and/or notification serves as positive feedback to a user of the second device 284 to confirm to the user that the user's intent to capture the active media content item has been fulfilled. In some embodiments, if immediate playback occurs, the notification is not displayed and the playback itself serves as the positive feedback.

In other embodiments, a notification can also be displayed on the first device 282, where the notification indicates that the active media content item has been captured by the second device 284.

The example configurations described above in FIGS. 4-6 implement NFC technology as the proximity-based technology that triggers the device-to-device media capturing. Use of NFC technology (or RFID technology that similarly relies on electromagnetic signals) can be beneficial in that a closer proximity range is required to initiate the NFC communication and exchange of data. Based on the closer proximity range, a user is required to move their device in very close or actual physical contact with another device to trigger the device-to-device media capturing. This increases the probability that such a device movement by the user is indicative of the user's intent to trigger the device-to-device media capturing in order to capture an active media content item. However, NFC and RFID technologies are just a few, non-limiting examples of the types of proximity-based technology that can be implemented. Other examples include BLE or Wi-Fi technologies. For example, the at least two media playback devices 101 can establish BLE and Wi-Fi connections to enable exchange of communications using the respective protocols, where the communications include similar information included in the NFC communications described above. In further examples, the NFC or RFID technologies can be used to establish one or more of these other BLE or Wi-Fi connections.

Figure 7:
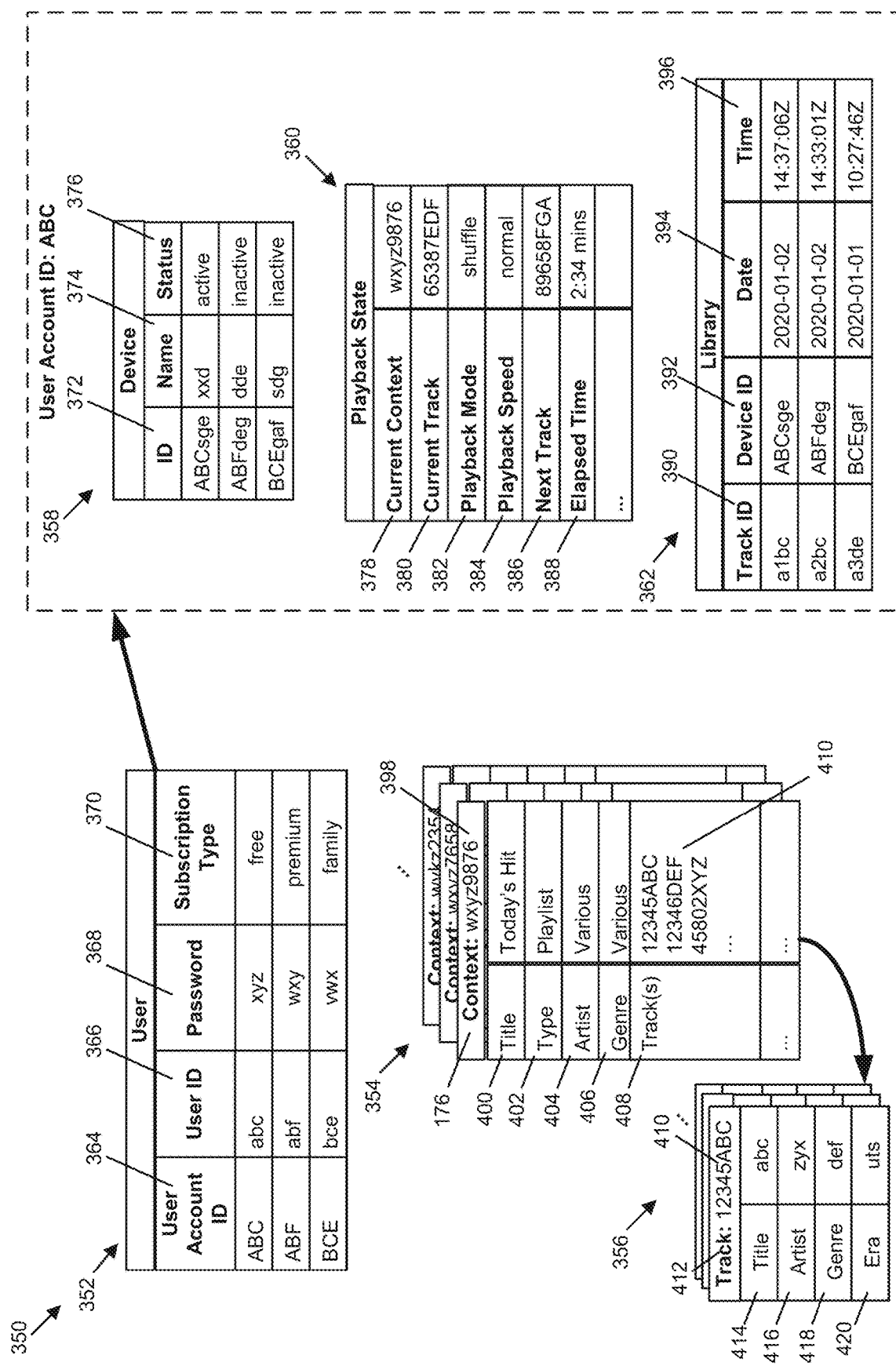
FIG. 7 illustrates an example data structure stored within one or more databases of a media delivery system that facilitates device-to-device media capturing.

FIG. 7 illustrates an example data structure 350 stored within one or more databases of the media delivery system 104 that facilitates the device-to-device media capturing. In other embodiments, the example data structure 350 or a portion thereof can be stored locally on each of the media playback devices 101. In this embodiment, the data structure 350 is represented with a plurality of tables which identifies a rational nature of the one or more databases. However, in alternative embodiments, the data may be stored using other database models.

In the illustrated example, the data structure 350 includes a user account table 352, a media context table 354, and a media content item table 356. For each user account, the data structure 350 includes a device data table 358, a playback state table 360, and at least one library table 362. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used. In addition, the data contained in the data structure 350 is stored according to a defined security policy and in accordance with applicable regulations.

In some embodiments, the user account table 352, the device data table 358, the playback state table 360, and the library table 362 are maintained within the account data store 163 of the media server application 152 of media delivery system 104, while the media context table 354 and the media content item table 356 are maintained within the media data store 162 of the media delivery system 104. In other embodiments, each of the tables may be maintained in a single database of the media delivery system 104.

The user account table 352 can be configured to include data usable to identify users and accounts of those users of the media delivery system 104 (e.g., a media content provider or a media service). In some embodiments, the user account table 352 can reference one or more other tables, and/or be referenced by one or more other tables. Some embodiments of the user account table 352 can contain a field for user account identifiers (IDs) 364, a field for user identifiers (IDs) 366, a field for passwords 368, and a field for subscription types 370. The user account ID field identifies a plurality of user account IDs 364 associated with the user accounts of the media delivery system 104. The user ID field identifies user IDs 366 associated with the one or more users of each of the user accounts. The user IDs 366 include names or other identification information that the users can use to identify themselves in the service provided by the media delivery system 104. The user IDs 366 can be set up by the users or automatically assigned to the users. The password field stores data associated with passwords 368 of the users, such as hashed and salted passwords. The subscription type field identifies subscription types 370 associated with the user accounts. Examples of the subscription types 370 include a free subscription and a fee-based subscription with a single tier or with multiple tiers. Such a fee-based subscription can provide services that the free subscription does not provide.

Referring still to FIG. 7, each user account that can be identified in the user account table 352 is associated with, and identifies, a set of data for providing various services from the media delivery system 104. In some embodiments, such a set of data includes a device data table 358, a playback state table 360, and at least one library table 362. In the illustrated example, the tables 358, 360, and 362 are primarily described to be associated with a single user account (e.g., User Account ID: ABC). However, it is understood that, in other embodiments, the tables 358, 360, and 362 can be structured to be associated with a plurality of user accounts.

The device data table 358 identifies one or more devices associated with a particular user account (e.g., User Account ID: ABC in FIG. 7). In some embodiments, the device data table 358 can be referenced by the user account table 352. Other tables can reference the device data table 358. The device data table 358 can also reference one or more other tables. The device data table 358 can contain a field for device identifiers (IDs) 372, a field for device names 374, and a field for device status 376. The device ID field includes one or more device IDs 372 of one or more media playback devices 101 that are associated with the particular user account. For example, User Account ID: ABC may include three different devices associated with the user account, where each of the three different devices includes a different device ID 372.

In some embodiments, a plurality of media playback devices 101 can be respectively used to access media content service from the media delivery system 104 which is associated with a single user account. For example, a user can use different media playback devices 101 to log in to media content service with the user's user account information, and the media content service associated with the user account can be provided to one or more of the media playback devices 101 through which the user has logged in to the user account.

The device name field includes one or more device names 374 associated with the device IDs 372. The device status field identifies a device status 376 for each of the media playback devices 101 identified in the device data table 358. In some embodiments, the device status 376 can be either active or inactive. When the device status 376 of a media playback device 101 is active, the media playback device 101 is in operation and accessible by the media delivery system 104 via the network 106. When the device status 376 of a media playback device 101 is inactive, the media playback device 101 is not in operation and thus inaccessible by the media delivery system 104 via the network 106.

The playback state table 360 includes information about playback of one or more media contexts 176. In some embodiments, where a plurality of media playback devices is used to play media content associated with a particular user account, only one of the plurality of media playback devices 101 can be used to play the media content while the other media playback devices may not be used to play the same media content simultaneously. In these embodiments, the playback state table 360 is configured to indicate playback information of the media content that is in common among the plurality of media playback devices associated with the particular user account. In other embodiments, the playback state table 360 is configured to indicate playback information for each of the media playback devices associated with the particular user account, where the media playback devices may be used independently to play media content in different manners.

In some embodiments, the playback state table 360 contains a current context 378, a current media content item (i.e., a current track) 380, a playback mode 382, a playback speed 384, a next media content item (i.e., a next track) 386, and an elapsed playback time 388. In addition or alternatively, the playback state table 360 can contain other playback-related information. In some embodiments, the playback state table 360 can reference one or more other tables, and/or be referenced by one or more other tables. The current context 378 indicates a media context 176 that is being currently played in a media playback device 101. The current media content item 380 indicates a media content item 170 that is being currently played from the current context 378. In some examples, the media content item being currently played back can be indicated by an identifier for the media content item 170. The playback mode 382 indicates a playback mode that is currently selected. Examples of the playback mode include a normal playback mode, a repeat playback mode, and a shuffle playback mode. The playback speed 384 indicates a playback speed that is currently selected. Examples of the playback speed include a normal playback speed, one or more faster playback speeds, and one or more slower playback speeds. The next media content item 386 indicates a media content item that is in queue and will be subsequently played after the current media content item 380. The elapsed playback time 388 indicates a time that a media content item has progressed for playback (e.g., a playback progress time). In some embodiments, the elapsed playback time 388 can include a remaining playback time which indicates a time that remains until the playback of a media content item is complete.

Referring still to FIG. 7, the library table 362 represents liked media content items playlist. The liked media content items playlist includes a set of media content items 170 that either a user associated with user account ID: ABC manually liked or favorited through a user interface of one or more of their devices or the identifiers thereof were automatically captured via device-to-device media capturing as described herein (e.g., by the user moving one their devices in close proximity to another device on which the media content item is an active media content item).

Each row of the library table 362 represents a media content item from the set and includes data associated with one or more fields of the library table 362. Exemplary fields include a media content item (e.g., track) ID field 390, a device ID field 392, a date field 394, and a time field 396. The media content item ID field 390 stores an identifier of the media content item that was manually liked/favorited or automatically captured through device-to-device media capturing. The device ID field 392 stores an identifier of the device that was used to manually like/favorite the media content item or automatically capture the media content item identifier through device-to-device media capturing. The date field 394 stores a date on which the media content item was manually liked/favorited or automatically captured through device-to-device media capturing. The time field 396 stores a time at which the media content item was manually liked/favorited or automatically captured through device-to-device media capturing. Other information related to each media content item in the set or details associated with a manner in which the media content item was captured for inclusion in the set (e.g., manual vs. automatic) can be included in the library table 362.

With reference still to FIG. 7, the media context table 354 is configured to identify one or more media contexts 176 as described with reference to FIG. 2. As illustrated, some embodiments of the media context table 354 can respectively identify a media context 176 by a media context identifier 398. The media context table 354 contains various pieces of information about a corresponding media context 176. Examples of such information include a media context title 400, a media context type 402, a media context artist 404, a media context genre 406, and a list of media content items 408 associated with the media context 176. Other information can also be included in the media context table 354.

The media context title 400 indicates a title of the media context 176. The media context type 402 indicates a type of the media context 176, such as a playlist, an album, an artist, and a track. The media context artist 404 indicates one or more artists associated with the media context 176. The media context genre 406 indicates a genre associated with the media context 176. The list of media content items 408 indicates one or more media content items (i.e., tracks) associated with the media context 176. Each of the media content items can be identified by a media content item (e.g., track) identifier 410. In some embodiments, one or more of the media content items 170, as described with reference to FIG. 2, are identified by the list of media content items 408.

The media content item table 356 is configured to identify one or more media content items (i.e., tracks) 412 by the track identifiers 410. In some embodiments, one or more of the media content items 412 are selected from the media content items 170 as described with reference to FIG. 2. For each media content item 412 identified by its respective track identifier 410, the media content item table 356 can store at least a portion of the media content metadata 174 as described with reference to FIG. 2. The media content metadata 174 can include various attributes of the media content item 412. Example attributes included in the media content item table 356 can include a media content item title 414, artist identification 416 (e.g., individual artist name or group name, or multiple artist names or group names), genre 418, era 420, and other attributes of the media content item.

Figure 8:
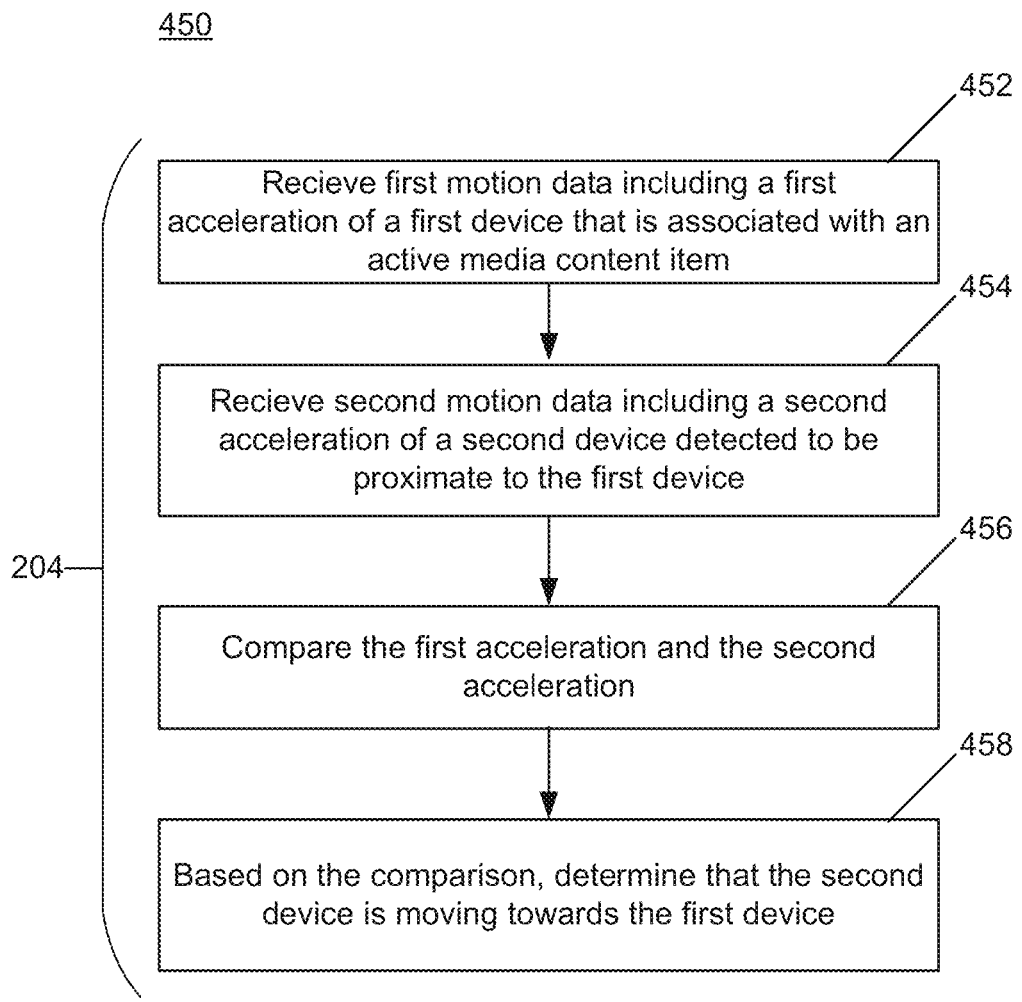
FIG. 8 illustrates an example method for determining movement of at least two devices relative to one another.

FIG. 8 illustrates an example method 450 for determining movement of at least two media playback devices 101 relative to one another. In some embodiments, the method 450 can be used to at least partially perform the operation 204 described in FIG. 3. The method 450 can be performed by the device-to-device media capturing engine 110 running on the media delivery system 104 as described in the first and second configurations of the device-to-device media capturing system in FIGS. 4 and 5 respectively. Alternatively, the method 450 can be performed locally on the media playback devices 101 based on the instructions to operate the device-to-device media capturing engine 110 stored in the memory of the media playback devices 101 similar to the third configuration of device-to-device media capturing system described in FIG. 6.

Returning to the example described in FIG. 1, the first device 102 is playing track A 113 and the second device 103 is being moved by the user in proximity of the first device 102. Following detection that the first device 102 and second device 103 are proximate to one another, the method 450 begins at operation 452 where a first acceleration of a first device that is associated with an active media content item (e.g., an acceleration of first device 102 playing track A 113) is received. In some embodiments, the first acceleration is included in first motion data collected by the motion detector of the first device, such as the motion detector 137 described in FIG. 2. In one example, the first acceleration included in the motion data is the acceleration of the first device at a time that the first and second devices came into very close or actual physical contact with one another.

At operation 454, a second acceleration of a second device detected to be proximate to the first device (e.g., an acceleration of second device 103) is received. In some embodiments, the second acceleration is included in second motion data collected by the motion detector of the second device. In one example, the second acceleration included in the motion data is the acceleration of the second device at a time that the first and second devices came into very close or actual physical contact with one another.

In one embodiment, each of first and second motion data including the first and second acceleration, respectively, are transmitted to the media delivery system 104 over the network 106 and received at the device-to-device media capturing engine 110 running on the media delivery system 104. In another embodiment, the first device and the second device can exchange the first motion data and the second motion data with one another over one or more wireless communications. Accordingly, the device-to-device media capturing engine 110 running locally on the first device receives the first motion data from the motion detector of the first device and the second motion data from the wireless communication transmitted from the second device. Similarly, the device-to-device media capturing engine 110 running locally on the second device receives the second motion data from the motion detector of the second device and the first motion data from the wireless communication transmitted from the first device.

At operation 456, the first acceleration and the second acceleration are compared. In some embodiments, the first and second accelerations are compared to determine whether one or both of the devices are moving and if so, a speed and direction in which the devices are moving relative to each other.

At operation 458, a determination is made that the second device is moving towards the first device based on the comparison. For example, returning to the example presented in FIG. 1, the comparison indicates that the first device 102 is stationary based on the first acceleration and the second device 103 is a device that is moving towards the first device 102 based on the second acceleration.

Based on the determined movement of the devices relative to one another, a further determination can be made as to which device is the device to receive an identifier of the active content item for storage in a library of a user account associated with the device (e.g., which device is the device capturing the active media content item). In one embodiment, the second device moving towards the first device as controlled by a user of the second device indicates that the user's intent was to capture the active media content item. Thus, the identifier is to be stored in a library of a user account associated with the second device.

In another embodiment, the second device moving towards the first device as controlled by a user of the second device can indicate the user is willing to share the active media content item with the first device (e.g., after a user of the first device indicates interests). Thus, the identifier is to be stored in a library of a user account associated with the first device.

In further embodiments, and as described in detail in FIG. 9 below, when an active media content item is associated with both devices, the difference between the first and second accelerations can be used to determine which of the devices, if any, is to receive the identifier of the active media content item associated with the other device.

Figure 9:
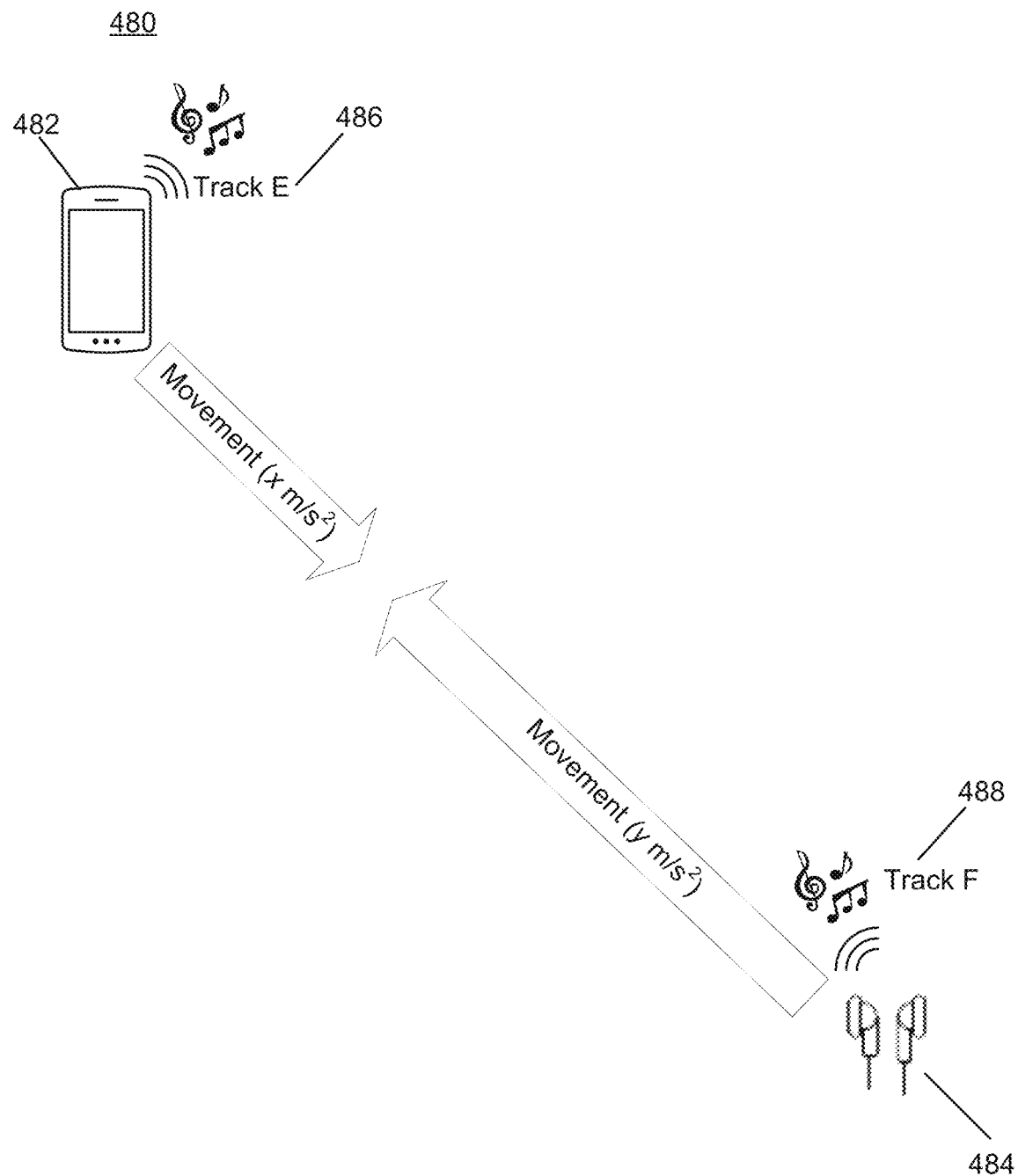
FIG. 9 illustrates a conceptual diagram for determining a media content item to capture based on a movement of at least two devices relative to one another when each of the two devices are associated with an active media content item.

FIG. 9 illustrates a conceptual diagram 480 for determining a media content item to be captured based on a movement of at least two devices relative to one another when each of the two devices are associated with an active media content item.

As illustrated in diagram 480, media playback devices 101, including a first device 482 and a second device 484, are simultaneously moved toward one another into very close or actual physical contact (e.g., into proximity of one another). The first device 482 is a smartphone, for example, that is associated with a first user account of a media service. The first device 482 is also associated with a first active media content item (e.g., Track E 486) provided by the media service. In some embodiments, due to the active media content item, a module of the first device 482 is activated that awaits a proximity-based interaction with another device. The second device 484 is a pair of smart headphones, for example, that is associated with a second user account of the media service. The second device 484 is also associated with a second active media content item (e.g., Track F 488) provided by the media service. In some embodiments, due to the active media content item, a module of the second device 484 is activated that awaits a proximity-based interaction with another device.

Based on the proximity of the first device 482 and the second device 484, device-to-device media capturing is triggered resulting in the provision and/or exchange of various data, including first motion data of the first device 482 and second motion data of the second device 484. In some embodiments, the motion data includes an acceleration of each device. In one example, the acceleration included in the motion data is the acceleration at a time that the first device 482 and second device 484 came into very close or actual physical contact with one another.

As one illustrative example, the first motion data of the first device 482 indicates that the first device 482 had a first acceleration of x meters per second squared ($m/s^2$) in a direction toward the second device 484. The second motion data of the second device 484 indicates that the second device 484 had a second acceleration of y $m/s^2$ in a direction toward the first device 482, where y is greater than x.

Based on the determined movement of both the devices relative to one another and the active media content item associated with each device, a further determination can be made as to which of the devices, if any, is to receive an identifier of the active content item of the other device for storage in a library of a user account associated with the device (e.g., which device is the device capturing the active media content item). In some embodiments, a device having a greater acceleration is determined to be the device capturing the active content item that will receive the identifier. Thus, in the example illustrated in FIG. 9, the second device 484 having the greater acceleration of y $m/s^2$ is determined to be the device capturing the active media content item. As a result, an identifier for the first active media content item associated with the first device 482 (e.g., a Track E ID) is stored in a library of the second user account associated with second device 484.

In other embodiments, the device having the greater acceleration is determined to be the device capturing the active content item when that acceleration is greater than an acceleration of the other device by a predefined threshold. In other words, the difference between the accelerations is greater than the predefined threshold. As a result, if the accelerations are about the same and thus the difference between them is not greater than the predefined threshold, in one example, neither device is determined to be the device capturing the active content item. That is, no device will receive the identifier. Thus, in the example illustrated in FIG. 9, even though the second device 484 has the greater acceleration of y $m/s^2$, if the difference between x and y is not greater than the threshold, the identifier for the first active media content item 486 associated with the first device 482 (e.g., a Track E ID) will not be stored in a library of the second user account associated with second device 484. Similarly, an identifier for the second active media content item 488 associated with the second device 484 (e.g., a Track F ID) will not be stored in a library of the first user account associated with first device 482.

In another example, if the accelerations are about the same and thus the difference between them is not greater than the predefined threshold, both devices can be determined to be the device capturing the active media content item. That is, both devices will receive the identifier for the active media content item associated with the other device. Thus, in the example illustrated in FIG. 9, the identifier for the first active media content item associated with the first device 482 (e.g., a Track E ID) will be stored in a library of the second user account associated with second device 484. Similarly, the identifier for the second active media content item associated with the second device 484 (e.g., a Track F ID) will be stored in a library of the first user account associated with first device 482.

Figure 10:
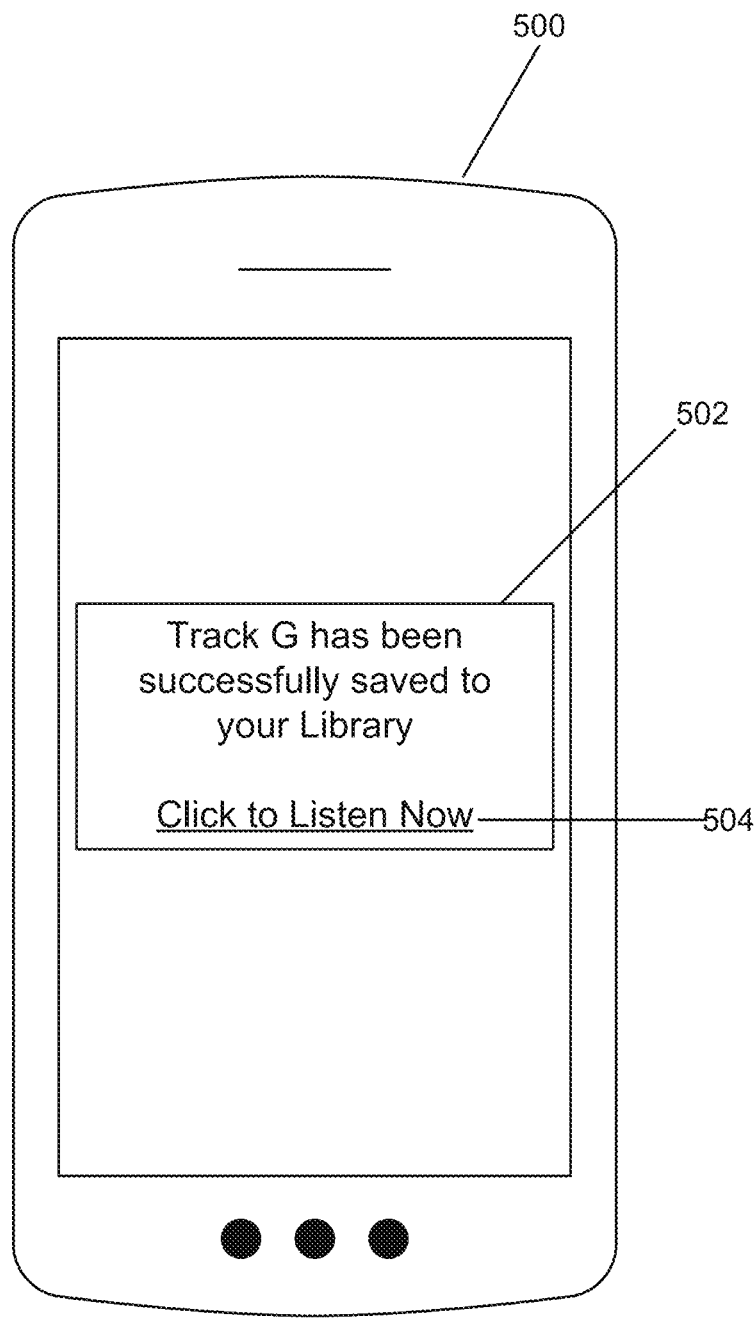
FIG. 10 illustrates an example notification displayed to indicate storage of an active media content item identifier.

FIG. 10 illustrates an example notification 502 displayed on a device 500 to indicate storage of an active media content item identifier. In this example, the device 500 is associated with a user account of a media service. A user of the device 500 having the intent to capture an active media content item (e.g., Track G) associated with another device moves the device 500 into proximity with the other device. As a result of the detected proximity and determination that the device 500 is moving toward the other device, the device 500 is determined to be the device capturing the active media content item, and an identifier of the active media content item (e.g., Track G ID) is stored to a library of the user account associated with the device 500. In some embodiments, upon storage of the identifier, the notification 502 is displayed on a user interface of the device 500 as a form of positive feedback to the user to indicate the storage of the active media content item identifier to the library. In some examples, the notification 502 can include a selectable option 504 to play the active media content item whose identifier was stored to the library. In other examples, at least a snippet of the active media content item is automatically played by the device 500 upon storage. In further examples, such automatic playback serves as the positive feedback to the user, and thus the notification 502 is not displayed when automatic playback occurs.

As illustrated, the notification 502 is a visual notification displayed on a user interface of the device 500. In some examples, the notification 502 is a pop-up notification associated with an application running on the device 500 (e.g., an application associated with the media service). In other examples, the notification 502 can be provided as a message, such as an application message or an SMS (Short Message Service) message. In some embodiments, the notification 502 can be displayed on a different device than the device that was used to capture the active media content item (e.g., if the device used to capture the active media content item does not have a user interface). The different device is another device associated with the user account of the media service (e.g., determined based on user account data 177). In further embodiments, the notification 502 can be an audio notification, such as a tone, alert, or speech.

Figure 11:
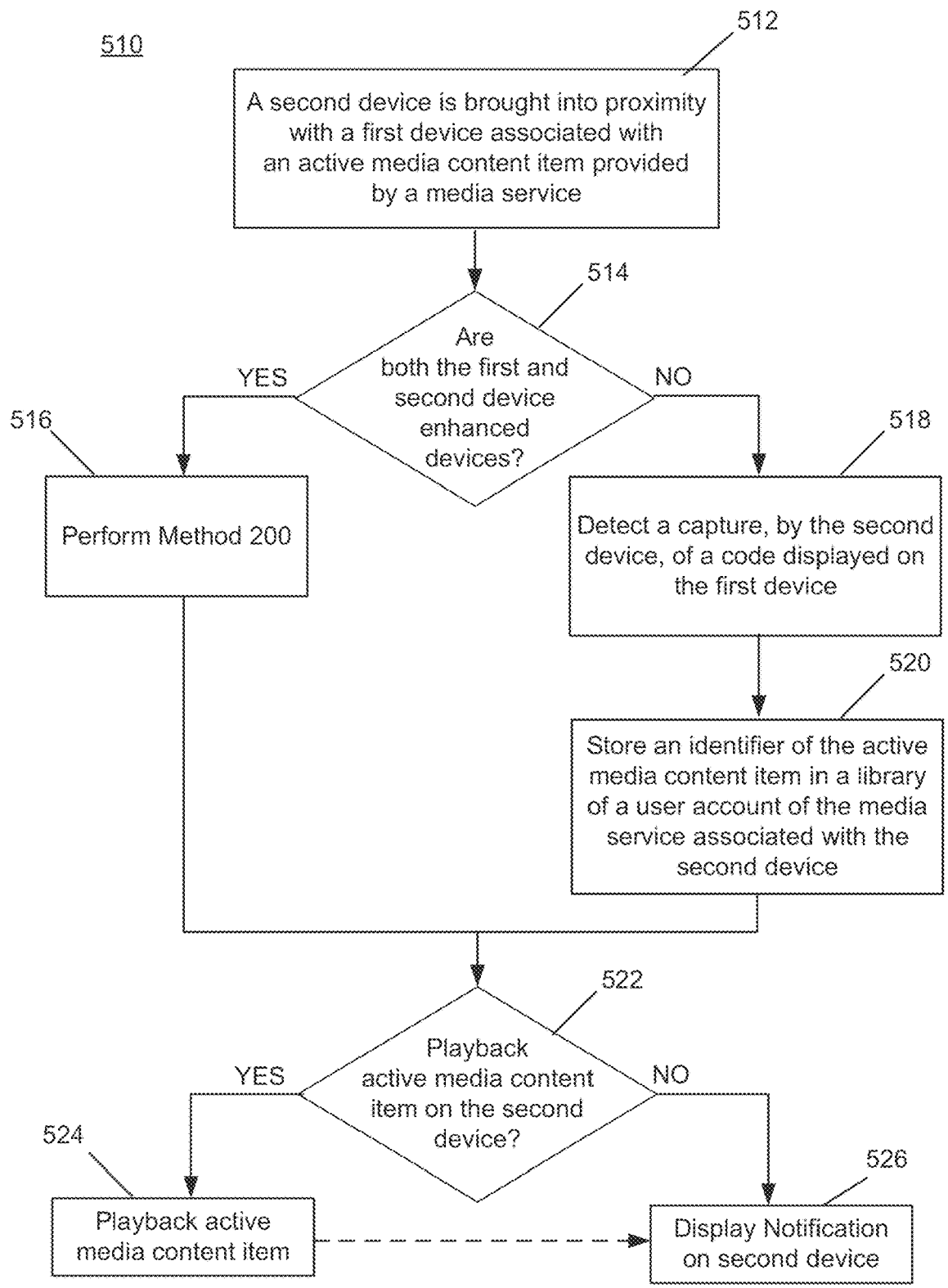
FIG. 11 illustrates an example process flow diagram for capturing an active media content item.

FIG. 11 illustrates an example process flow diagram 510 for capturing an active media content item. In FIGS. 1-10 and the corresponding description above, the at least two media playback devices participating in the device-to-device media capturing have been assumed to be capable of supporting the proximity-based technology that triggers the device-to-device media capturing process. For example, each of the media playback devices have been assumed to be NFC-capable (or alternatively RFID-capable, BLE-capable, and/or Wi-Fi capable). However, in some embodiments, at least one of the media playback devices may not have such capabilities. Therefore, FIG. 11 describes alternative operations that can be performed in such instances to enable capture of the active media content item.

Process flow diagram 510 begins at step 512, where a second device is brought into proximity with a first device that is associated with an active media content item provided by a media service. In some examples, at least a portion of the media content metadata (e.g., media content metadata 174) for the active media content item is received and displayed by the first device, including a machine-readable code, cover art, and/or a text description, including information such as title, artist name, album name, length, genre, mood, or era.

At step 514, a decision is made whether both the first device and the second device are enhanced devices. Enhanced devices are devices capable of supporting a type of proximity-based technology being implemented to trigger the device-to-device media capturing, such as NFC. In other examples, the proximity-based technology implemented can be RFID, BLE, and/or Wi-Fi technologies. If both the first and second devices are NFC-capable for example, and thus enhanced devices, the process flow diagram 510 proceeds to step 516, where the method 200 described with reference to FIG. 3 is performed. If one or both of the first and second devices are not NFC-capable for example, and thus are not enhanced devices, the process flow diagram 510 proceeds to step 518. In other embodiments, dependent on the type of proximity-based technology implemented, the decision at step 514 can further include a determination of whether an associated network is active (e.g., online), where if the network is active, the process flow diagram 510 proceeds to step 516, and otherwise the process flow diagram 510 proceeds to step 518.

At step 518, a capture, by the second device, of the machine-readable code for the active media content item displayed on the first device is detected. For example, the code is scanned or captured by a camera of the second device, where the code can be linked to or include an identifier for the active media content item. Based on the detected capture, the identifier for the active media content item can be automatically stored in a library of a user account of the media service associated with the second device at step 520.

In some embodiments, after either step 516 or step 520 is performed, a further decision whether to playback the active media content item on the second device is made at step 522. In some examples, the decision can be made based a plurality of factors. Example factors can include the following: predefined playback settings for the second device or the user account associated with the second device, whether another media content item is active on the second device, a time of day, a day of the week, and/or a location of the second device, among other examples. As one illustrative example, if it is a weekend afternoon and the second device is determined to be located at a gym, a decision is made to immediately playback the active media content item on the second device based on an assumption (given the factors) that the user of the second device would be interested in and able to listen now. As another illustrative example, if it is a weekday morning and the second device is determined to be located at a place of business, a decision is made to not playback the active media content item on the second device based on an assumption (given the factors) that it would not be appropriate for the user of the second device to listen now as they are likely at work and unable to do so.

If at step 522 a decision is made to playback the active media content item, the active media content item is played on the second device at step 524. If at step 522 a decision is made to not playback the active media content item, a notification is displayed on the second device at step 526. The notification as described in detail above with reference to FIG. 10 provides positive feedback to a user of the second device that the active media content item was captured. In some examples, if the active media content item is played on the second device at step 524, the notification can optionally be displayed on the second device concurrently with the playback. In other examples, the playback of the active media content item alone provides the positive feedback to the user, and thus the notification is not displayed. In other embodiments, a notification can also be displayed on the first device, where the notification indicates that the active media content item has been captured by the second device.

Also disclosed are examples according to the following clauses:

Clause 1. A method for device-to-device media capturing, the method comprising: detecting that a first device and a second device are proximate to one another, wherein the first device is associated with a first user account of a media service and an active media content item provided by the media service, and the second device is associated with a second user account of the media service; determining that the second device is moving toward the first device; and storing an identifier of the active media content item to a library associated with the second user account.

Clause 2. The method of clause 1, further comprising: based on the determination that the second device is moving toward the first device, determining that the second device is a receiving device that is capturing the active media content item; and in response to determining that the second device is the receiving device, storing the identifier of the active media content item to the library associated with the second user account.

Clause 3. The method of clause 1 or 2, wherein based on the proximity of the first device and the second device, one or more wireless communications are transmitted between the first device and the second device causing: the first device to receive a second media service identifier associated with the second user account from the second device, and the second device to receive a first media service identifier associated with the first user account from the first device.

Clause 4. The method of clause 3, wherein the one or more wireless communications include at least one of the following communication types: Near Field Communication (NFC), Radio Frequency Identification (RFID), BLUETOOTH® Low Energy (BLE), or Wi-Fi®.

Clause 5. The method of clause 3 or 4, wherein detecting that the first device and the second device are proximate to one another comprises: receiving, from the first device, the second media service identifier; receiving, from the second device, the first media service identifier; and detecting that the first device and the second device are proximate to one another based on a correlation between the respective media service identifier received from the respective device.

Clause 6. The method of any preceding clause, wherein determining that the second device is moving toward the first device comprises: receiving, from the first device, first motion data associated with the first device; receiving, from the second device, second motion data associated with the second device; comparing the first motion data and the second motion data; and based on the comparison, determining that the second device is moving toward the first device.

Clause 7. The method of clause 6, wherein the first motion data and the second motion data include a first acceleration of the first device and a second acceleration of the second device, and the second acceleration is greater than the first acceleration.

Clause 8. The method of clause 7, wherein when the second device is associated with another active media content item, the identifier of the active media content item is stored to the library associated with the second user account in response to determining that the second acceleration of the second device is greater than the first acceleration of the first device by a predefined threshold.

Clause 9. The method of any preceding clause, further comprising: causing immediate playback of the active media content item on the second device upon storage of the identifier.

Clause 10. The method of any preceding clause, further comprising: providing a notification to the second device for display, the notification indicating the storage of the identifier of the active media content item to the library associated with the second user account.

Clause 11. The method of clause 10, further comprising: providing the notification to the second device for display in response to a determination to not immediately playback the active media content item on the second device.

Clause 12. The method of any preceding clause, further comprising: providing to the first device for display a machine-readable code that includes the identifier of the active media content item, wherein the identifier is automatically stored in another library for another user account of the media service associated with a third device in response to the machine-readable code being captured by a camera of the third device.

Clause 13. A server for device-to-device media capturing, the server comprising: at least one processing device; and a memory coupled to the at least one processing device and storing instructions, that when executed by the at least one processing device, cause the at least one processing device to: detect that a first device and a second device are proximate to one another, wherein the first device is associated with a first user account of a media service and an active media content item provided by the media service, and the second device is associated with a second user account of the media service; determine that the second device is moving toward the first device; and store an identifier of the active media content item to a library associated with the second user account.

Clause 14. The server of clause 13, wherein to detect that the first device and the second device are proximate to one another, the at least one processing device is further caused to: receive, from the first device, a second media service identifier associated with the second user account that the first device received in one or more wireless communications transmitted between the first device and the second device based on the first device and the second device being proximate to one another; receive, from the second device, a first media service identifier associated with the first user account that the second device received from the first device in the one or more wireless communications; and detect that the first device and the second device are proximate to one another based on a correlation between the respective media service identifier received from the respective device.

Clause 15. The server of clause 13 or 14, wherein to determine that the second device is moving toward the first device, the at least one processing device is further caused to: receive, from the first device, first motion data associated with the first device; receive, from the second device, second motion data associated with the second device; compare the first motion data and the second motion data; and based on the comparison, determine that the second device is moving toward the first device.

Clause 16. The server of any of clauses 13 to 15, wherein the at least one processing device is further caused to at least one of: cause immediate playback of the active media content item on the second device upon storage of the identifier; and provide a notification to the second device for display, the notification indicating the storage of the identifier of the active media content item to the library associated with the second user account.

Clause 17. The server of clause 16, wherein the notification is provided in response to a determination to not immediately playback the active media content item on the second device.

Clause 18. A non-transitory computer readable storage medium storing executable instructions which, when executed by at least one processing device, cause the at least one processing device to: detect that a first device and a second device are proximate to one another, wherein the first device is associated with a first user account of a media service and an active media content item provided by the media service, and the second device is associated with a second user account of the media service; determine that the second device is moving toward the first device; and store an identifier of the active media content item to a library associated with the second user account.

Clause 19. The non-transitory computer readable storage medium of clause 18, wherein to detect that the first device and the second device are proximate to one another, the at least one processing device is further caused to: receive, from the first device, a second media service identifier associated with the second user account that the first device received in one or more wireless communications transmitted between the first device and the second device based on the first device and the second device being proximate to one another; receive, from the second device, a first media service identifier associated with the first user account that the second device received from the first device in the one or more wireless communications; and detect that the first device and the second device are proximate to one another based on a correlation between the respective media service identifier received from the respective device.

Clause 20. The non-transitory computer readable storage medium of clause 18 or 19, wherein to determine that the second device is moving toward the first device, the at least one processing device is further caused to: receive, from the first device, first motion data associated with the first device; receive, from the second device, second motion data associated with the second device; compare the first motion data and the second motion data; and based on the comparison, determine that the second device is moving toward the first device.

Clause 21. A first device associated with a first user account of a media service and an active media content item provided by the media service, the first device comprising: at least one processing device; and a memory coupled to the at least one processing device and storing instructions, that when executed by the at least one processing device, cause the at least one processing device to: detect that the first device and a second device are proximate to one another, wherein the second device is associated with a second user account of the media service; determine that the second device is moving toward the first device; and send an identifier of the active media content item to the second device.

Clause 22. The first device of clause 21, wherein to detect that the first device and the second device are proximate to one another, the at least one processing device is further caused to: receive, from the second device, a second media service identifier associated with the second user account, wherein the second media service identifier is received in one or more wireless communications transmitted between the second device and the first device based on the first device and the second device being proximate to one another; detect that the first device and the second device are proximate to one another based on the second media service identifier.

Clause 23. The first device of clause 21 or 22, wherein to determine that the second device is moving toward the first device, the at least one processing device is further caused to: receive, from the second device, second motion data associated with the second device; compare the second motion data and first motion data associated with the first device; and based on the comparison, determine that the second device is moving toward the first device.

Clause 24. A second device associated with a second user account of a media service, the second device comprising: at least one processing device; and a memory coupled to the at least one processing device and storing instructions, that when executed by the at least one processing device, cause the at least one processing device to: detect that the second device and a first device are proximate to one another, wherein the first device is associated with a first user account of a media service and an active media content item provided by the media service; determine that the second device is moving toward the first device; receive an identifier of the active media content item from the first device; and store the identifier to a library associated with the second user account.

Clause 25. The second device of clause 24, wherein to detect that the first device and the second device are proximate to one another, the at least one processing device is further caused to: receive, from the first device, a first media service identifier associated with the first user account, wherein the first media service identifier is received in one or more wireless communications transmitted between the first device and the second device based on the first device and the second device being proximate to one another; detect that the first device and the second device are proximate to one another based on the first media service identifier.

Clause 26. The second device of clause 24 or 25, wherein to determine that the second device is moving toward the first device, the at least one processing device is further caused to: receive, from the first device, first motion data associated with the first device; compare the first motion data and second motion data associated with the second device; and based on the comparison, determine that the second device is moving toward the first device.

Clause 27. The second device of any of clauses 24 to 26, wherein the at least one processing device is further caused to at least one of: cause immediate playback of the active media content item on the second device upon storage of the identifier; and display a notification indicating the storage of the identifier of the active media content item to the library associated with the second user account.

Clause 28. The second device of clause 27, wherein the notification is displayed in response to a determination to not immediately playback the active media content item on the second device.

Clause 29. A method for device-to-device media capturing, the method comprising: receiving, at a first device, an active media content item from a media service, wherein the first device is associated with a first user account of the media service; detecting, by the first device, a second device proximate to the first device, wherein the second device is associated with a second user account of the media service; determining, by the first device, that the second device is moving toward the first device; and sending, from the first device, an identifier of the active media content item to the second device.

Clause 30. A method for device-to-device media capturing, the method comprising: detecting, by a second device, a first device proximate to the second device, wherein the first device is associated with a first user account of a media service and an active media content item provided by the media service and the second device is associated with a second user account of the media service; determining, by the second device, that the second device is moving toward the first device; receiving, at the second device, an identifier of the active media content item from the first device; and storing the identifier to a library associated with the second user account.

The various examples and teachings described herein are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method for device-to-device media capturing, the method comprising:
    detecting that a first device and a second device are proximate to one another, wherein the first device is associated with a first user account of a media service and an active media content item provided by the media service, and the second device is associated with a second user account of the media service;
    determining that the second device is moving toward the first device, including:
        receiving, from the first device, first motion data associated with the first device;
        receiving, from the second device, second motion data associated with the second device;
        comparing the first motion data and the second motion data; and
        based on the comparison, determining that the second device is moving toward the first device; and
    in response to detecting that the first device and the second device are proximate to one another and determining that the second device is moving toward the first device, storing an identifier of the active media content item to a library associated with the second user account.

2. The method of claim 1, further comprising:
    based on the determination that the second device is moving toward the first device, determining that the second device is a receiving device that is capturing the active media content item; and
    in response to determining that the second device is the receiving device, storing the identifier of the active media content item to the library associated with the second user account.

3. The method of claim 1, wherein based on the proximity of the first device and the second device, one or more wireless communications are transmitted between the first device and the second device causing:
    the first device to receive a second media service identifier associated with the second user account from the second device, and
    the second device to receive a first media service identifier associated with the first user account from the first device.

4. The method of claim 3, wherein the one or more wireless communications include at least one of the following communication types: Near Field Communication (NFC), Radio Frequency Identification (RFID), BLUETOOTH® Low Energy (BLE), or Wi-Fi.

5. The method of claim 3, wherein detecting that the first device and the second device are proximate to one another comprises:
    receiving, from the first device, the second media service identifier;
    receiving, from the second device, the first media service identifier; and
    detecting that the first device and the second device are proximate to one another based on a correlation between the respective media service identifier received from the respective device.

6. The method of claim 1, wherein the first motion data and the second motion data include a first acceleration of the first device and a second acceleration of the second device, and the second acceleration is greater than the first acceleration.

7. The method of claim 6, wherein when the second device is associated with another active media content item, the identifier of the active media content item is stored to the library associated with the second user account in response to determining that the second acceleration of the second device is greater than the first acceleration of the first device by a predefined threshold.

8. The method of claim 1, further comprising:
    causing immediate playback of the active media content item on the second device upon storage of the identifier.

9. The method of claim 1, further comprising:
    providing a notification to the second device for display, the notification indicating the storage of the identifier of the active media content item to the library associated with the second user account.

10. The method of claim 9, further comprising:
    providing the notification to the second device for display in response to a determination to not immediately playback the active media content item on the second device.

11. The method of claim 1, further comprising:
    providing to the first device for display a machine-readable code that includes the identifier of the active media content item, wherein the identifier is automatically stored in another library for another user account of the media service associated with a third device in response to the machine-readable code being captured by a camera of the third device.

12. A server for device-to-device media capturing, the server comprising:
    at least one processing device; and
    a memory coupled to the at least one processing device and storing instructions, that when executed by the at least one processing device, cause the at least one processing device to:
        detect that a first device and a second device are proximate to one another, wherein the first device is associated with a first user account of a media service and an active media content item provided by the media service, and the second device is associated with a second user account of the media service;
        determine that the second device is moving toward the first device, including to:
            receive, from the first device, first motion data associated with the first device;
            receive, from the second device, second motion data associated with the second device;
            compare the first motion data and the second motion data; and
            based on the comparison, determine that the second device is moving toward the first device; and
        in response to detecting that the first device and the second device are proximate to one another and determining that the second device is moving toward the first device, store an identifier of the active media content item to a library associated with the second user account.

13. The server of claim 12, wherein to detect that the first device and the second device are proximate to one another, the at least one processing device is further caused to:
receive, from the first device, a second media service identifier associated with the second user account that the first device received in one or more wireless communications transmitted between the first device and the second device based on the first device and the second device being proximate to one another;
receive, from the second device, a first media service identifier associated with the first user account that the second device received from the first device in the one or more wireless communications; and
detect that the first device and the second device are proximate to one another based on a correlation between the respective media service identifier received from the respective device.

14. The server of claim 12, wherein the at least one processing device is further caused to at least one of:
cause immediate playback of the active media content item on the second device upon storage of the identifier; and
provide a notification to the second device for display, the notification indicating the storage of the identifier of the active media content item to the library associated with the second user account.

15. The server of claim 14, wherein the notification is provided in response to a determination to not immediately playback the active media content item on the second device.

16. A non-transitory computer readable storage medium storing executable instructions which, when executed by at least one processing device, cause the at least one processing device to:
detect that a first device and a second device are proximate to one another, wherein the first device is associated with a first user account of a media service and an active media content item provided by the media service, and the second device is associated with a second user account of the media service;
determine that the second device is moving toward the first device, including to:
receiving, from the first device, first motion data associated with the first device;
receiving, from the second device, second motion data associated with the second device;
comparing the first motion data and the second motion data; and
based on the comparison, determining that the second device is moving toward the first device; and
in response to detecting that the first device and the second device are proximate to one another and determining that the second device is moving toward the first device, store an identifier of the active media content item to a library associated with the second user account.

17. The non-transitory computer readable storage medium of claim 16, wherein to detect that the first device and the second device are proximate to one another, the at least one processing device is further caused to:
receive, from the first device, a second media service identifier associated with the second user account that the first device received in one or more wireless communications transmitted between the first device and the second device based on the first device and the second device being proximate to one another;
receive, from the second device, a first media service identifier associated with the first user account that the second device received from the first device in the one or more wireless communications; and
detect that the first device and the second device are proximate to one another based on a correlation between the respective media service identifier received from the respective device.

\* \* \* \* \*